(12) United States Patent
Shibata et al.

(10) Patent No.: US 7,565,477 B2
(45) Date of Patent: Jul. 21, 2009

(54) SEMICONDUCTOR DEVICE AND METHOD OF CONTROLLING THE SAME

(75) Inventors: Kenji Shibata, Aichi-Prefecture (JP); Masahiko Okura, Aichi-Prefecture (JP); Kenta Kato, Aichi-Prefecture (JP); Mitsuhiro Nagao, Aichi-Prefecture (JP); Stewart Wang, Fremont, CA (US); Katherine Butler, Sunnyvale, CA (US); Cheung Nga Tik, Hong Kong (HK)

(73) Assignee: Spansion LLC, Sunnyvale, CA (US)

( * ) Notice: Subject to any disclaimer, the term of this patent is extended or adjusted under 35 U.S.C. 154(b) by 383 days.

(21) Appl. No.: 11/644,031

(22) Filed: Dec. 22, 2006

(65) Prior Publication Data

US 2008/0155180 A1    Jun. 26, 2008

(51) Int. Cl.
*G06F 12/00* (2006.01)
(52) U.S. Cl. ...................................... 711/103
(58) Field of Classification Search ........................ None
See application file for complete search history.

(56) References Cited

U.S. PATENT DOCUMENTS 6,836,433 B2 * 12/2004 Kondo ................... 365/185.04
6,930,919 B2 * 8/2005 Lee et al. ............... 365/185.11

FOREIGN PATENT DOCUMENTS

| JP | 11232884   | 8/1999  |
|----|------------|---------|
| JP | 11306086   | 11/1999 |
| JP | 2002366436 | 12/2002 |
| JP | 2005085398 | 3/2005  |

* cited by examiner

*Primary Examiner*—Hiep T Nguyen

(57) ABSTRACT

A semiconductor device includes: memory regions that include non-volatile memory cells; disabling information memory units that correspond to the memory regions, each of the disabling information memory units storing first program disabling information indicating whether programming is to be disabled or enabled in each corresponding memory region; a program disabling information selection circuit that outputs second program disabling information for disabling programming in a corresponding memory region, regardless of the first program disabling information, when programming is disabled collectively in the memory regions in accordance with collective program disabling information indicating whether programming is to be disabled collectively in the memory regions, the program disabling information selection circuit outputting the first program disabling information as the second program disabling information when programming is not collectively disabled; and a program control circuit that disables or enables programming in the corresponding memory region in accordance with the second program disabling information.

25 Claims, 19 Drawing Sheets

| | | | | |
|---|---|---|---|---|
| First disabling program information (WPCAM data) 0: disable to program 1: enable to program | 0 | 1 | 0 | 1 |
| Batch disabling program information (CAM4 data) 0: disable to program in all memory region 1: not disable | 0 | 0 | 1 | 1 |
| Second disabling program information (Output from select circuit) 0: disable to program 1: enable to program | 0 | 0 | 0 | 1 |

FIG. 5

| STB option information (CAM1 data) 0: STB 1: not STB | 1 | | | | 0 | |
|---|---|---|---|---|---|---|
| Disabling assistance information (CAM3 data) 0: disable assistance information 1: enable assistance information | Don't care | | | 0 | | 1 |
| Assistance disabling program information (Reset pin data) 0: disable to program 1: enable to program | 0 | 1 | | 0 | 1 | Don't care |
| Switch27 for writing WPCAM | OFF | ON | OFF | OFF | ON | ON |

FIG. 11

SEMICONDUCTOR DEVICE AND METHOD OF CONTROLLING THE SAME

BACKGROUND OF THE INVENTION

1. Field of the Invention

The present invention generally relates to a semiconductor device and a method of controlling the semiconductor device, and more particularly, to a semiconductor device having non-volatile memory cells and a method of controlling the semiconductor device.

2. Description of the Related Art

In recent years, non-volatile memories that are semiconductor devices in which data can be rewritten have been widely used for various electronic devices such as portable telephone devices and digital cameras. A flash memory that is a typical non-volatile memory accumulates charges in the charge accumulation layers of the memory cells so as to write data into the memory cells in a non-volatile manner. The data can be erased by eliminating charges from the charge accumulation layers. Some non-volatile memories have protection functions for prohibiting writing and erasing data in the memory cells and reading of the data from the memory cells for security purposes.

In this specification, data writing (data being "0", and the threshold voltage of a subject memory cell being increased) or data erasing (data being "1", and the threshold voltage of a subject memory cell being lowered) is referred to as "programming". Also, programming of data in a subject memory cell (data "1" being changed to "0", or data "0" being changed to "1"), writing of data into a subject memory cell (data "1" being changed to "0"), erasing of data in a subject memory cell (data "0" being changed to "1"), and reading (data "0" or "1" being output) are called memory cell programming, memory cell writing, memory cell erasing, and memory cell reading, respectively. Further, programming, writing, erasing, and reading of data in and from the memory cells in a subject memory region including two or more memory cells are called memory region programming, memory region writing, memory region erasing, and memory region reading, respectively.

A method of prohibiting programming (data writing or erasing) in a memory cell may be realized by a function of disabling or enabling programming in each of the memory regions. Such a function is called a write-protect function. To achieve this function, a disabling information memory unit that stores program disabling information indicating whether programming is to be disabled or enabled in a subject memory region is provided for each of the memory regions in a non-volatile memory.

Japanese Unexamined Patent Publication No. 5-266681 (Patent Document 1) discloses a non-volatile memory that includes a write restricting register (equivalent to the disabling information memory units) and the memory cell array and a logic circuit for restricting writing into the write restricting register.

Utilizing the technique disclosed in Patent Document 1, a non-volatile memory has been developed. After the memory region is switched to the program disabled state, this non-volatile memory has the function of prohibiting a change of a memory region from a program disabled state to a program enabled state (in this manner, the memory region ROM-ize after once it is put into the program disabled state). This function is called the STB (Set Top Box) function. Such a non-volatile memory can determine whether the STB function should be made valid or invalid. To realize this function, ROM information is set for indicating whether to prohibit a change of the program disabling information from a program disabling state to a program enabling state after the program disabling information is switched to the program disabling state (whether the subject memory region should be turned into a ROM). The ROM information is stored in a ROM information memory unit of a non-volatile type. For example, when the non-volatile memory is shipped, the ROM information is set in response to a request of its user. Or only a user having authority can set ROM-ize information. By doing so, falsification (rewriting) of the data stored in the ROM memory regions by a hacker or the like can be prevented.

Japanese Unexamined Patent Publication No. 11-213680 (Patent Document 2) discloses a non-volatile memory that sets two or more pieces of write protect information (equivalent to the program disabling information) at the same time. Therefore, a latch circuit is provided for each of the write protect memory circuits (equivalent to the disabling information memory units), and the program disabling information in the write protect memory circuits is set through the latch circuits at the same time.

By the technique disclosed in Japanese Unexamined Patent Publication No. 2002-342164 (Patent Document 3), management information for performing individual control for each memory region is set, and access is prohibited by setting control information. The non-volatile memory disclosed in Patent Document 3 has a memory unit that collectively stores the control information as the management information.

Japanese Unexamined Patent Publication No. 2000-268584 (Patent Document 4) discloses a non-volatile memory that includes an erasing disabling circuit that disables erasing in each memory region, and has a function of canceling a erasing disabled state.

With the non-volatile memory disclosed in Patent Document 2, a higher security level can be achieved, as more than one piece of program disabling information can be set at once. In doing so, however, more than one latch circuit is needed. As a result, the circuit area becomes larger. Moreover, as the information is input to several latch circuits, dispersion of the programming time varies among the latch circuits, resulting in an increase of the programming time. The non-volatile memory disclosed in Patent Document 3 has a memory unit that collectively stores the control information for prohibiting accesses. However, Patent Document 3 does not disclose a specific method of disabling programming collectively in several memory regions where the disabling information memory units are provided for the respective memory regions. Therefore, an object of the present invention is to provide a semiconductor device that can disable programming in several memory regions at once and still has a smaller circuit area, and to provide a method of controlling such a semiconductor device.

There has also been a non-volatile memory that does not allow a change of the program disabling information to a program disabling state if a high potential is not applied to an auxiliary input terminal when the program disabling information is to be switched from a program enabling state to a program disabling state. In such a non-volatile memory, however, the program disabling information cannot be switched from a program enabling state to a program disabling state via a communication line, for example. Depending on the purposes, the application of a high potential to the auxiliary input terminal is sometimes not preferable as the condition for switching the program disabling information to a program disabling state. Therefore, another object of the present invention is to provide a semiconductor device that can determine whether to use the application of a high potential to the auxiliary input terminal as the condition for switching the program information from a program enabling state to a program disabling state, and to provide a method of controlling such a semiconductor device.

There is also a demand for a non-volatile memory that has the STB function and the erasing disabling canceling function as disclosed in the Patent Document 4. In such a non-volatile memory, the STB function coexists with the function of canceling a program disabled state in a group of memory regions and performing erasing collectively (a batch erasing) in the memory regions in the group. In a case where the program disabling information is to be protected through the STB function, it is necessary to prevent erasing by the collective erasing function in each program-disabled memory region. Therefore, yet another object of the present invention is to provide a semiconductor device that can have the STB function and the collective erasing function cooperating with each other, and to provide a method of controlling such a semiconductor device.

SUMMARY OF THE INVENTION

It is therefore an object of the present invention to provide a semiconductor device and a method of controlling the semiconductor device in which the above disadvantages are eliminated.

A more specific object of the present invention is to provide a semiconductor device that can disable programming in more than one memory region at once and has a smaller circuit area. The present invention also provides a method of controlling such a semiconductor device. The present invention further provides a semiconductor device that can determine whether to use the application of a high potential to the auxiliary input terminal as the condition for switching the program disabling information to a program disabling state. The present invention also provides a method of controlling such a semiconductor device. The present invention further provides a semiconductor device that can have the STB function and the collecting erasing function cooperating with each other. The present invention also provides a method of controlling such a semiconductor device.

According to an aspect of the present invention, there is provided a semiconductor device including: a plurality of memory regions that include non-volatile memory cells; a plurality of disabling information memory units that correspond to the memory regions, each of the disabling information memory units storing first program disabling information indicating whether programming is to be disabled or enabled in each corresponding memory region; a program disabling information selection circuit that outputs second program disabling information for disabling programming in a corresponding memory region, regardless of the first program disabling information, when programming is disabled collectively in the memory regions in accordance with collective program disabling information indicating whether programming is to be disabled collectively in the memory regions, the program disabling information selection circuit outputting the first program disabling information as the second program disabling information when programming is not collectively disabled; and a program control circuit that disables or enables programming in the corresponding memory region in accordance with the second program disabling information. Thus, programming can be disabled in two or more memory regions at once. With this semiconductor device, the setting time can be made shorter and the circuit size can be made smaller than in a case where the first program disabling information is set for the memory regions one by one.

The semiconductor device may further include a collective disabling information memory unit that stores the collective program disabling information.

The semiconductor device may further include a disabling information control circuit that prohibits a change of the first program disabling information from a program disabling state to a program enabling state, after the first program disabling information is switched to the program disabling state. With this structure, the security level can be made higher.

The semiconductor device may further include a ROM information memory unit that stores ROM information indicating whether a change of the first program disabling information from the program disabling state to the program enabling state is prohibited, after the first program disabling information is switched to the program disabling state, wherein the disabling information control circuit prohibits the change of the first program disabling information from the program disabling state to the program enabling state in accordance with the ROM information after the first program disabling information is switched to the program disabling state. With this structure, the security level can be made higher.

The semiconductor device may be configured so that wherein the disabling information memory units and the collective disabling information memory unit use different commands from each other. With this structure, each of the disabling information memory units and the collective disabling information memory unit can be controlled independently of each other, and falsification (rewriting) of the collective program disabling information can be more strictly prohibited.

The semiconductor device may be configured so that an erasing unit for erasing the first program disabling information in the disabling information memory units is different from an erasing unit for erasing the collective program disabling information in the collective disabling information memory unit. With this structure, simultaneous erasing of the program disabling information and the collective program disabling information can be prevented, and a non-volatile memory with higher security can be provided.

According to another aspect of the present invention, there is provided a method of controlling a semiconductor device that has a plurality of memory regions including a plurality of non-volatile memory cells, the method comprising the steps of: setting second program disabling information in a program disabling state, regardless of first program disabling information indicating whether programming is to be disabled or enabled in a corresponding memory region, when programming is disabled collectively in the memory regions in accordance with collective program disabling information indicating whether programming is to be disabled or enabled collectively in the memory regions, and setting the first program disabling information as the second program disabling information when programming is not collectively disabled; and disabling or enabling programming in the corresponding memory region in accordance with the second program disabling information. Thus, programming can be disabled in two or more memory regions at once. With this semiconductor device, the setting time can be made shorter and the circuit size can be made smaller than in a case where the first program disabling information is set for the memory regions one by one.

The method may further include the step of prohibiting a change of the first program disabling information from a program disabling state to a program enabling state, after the first program disabling information is switched to the program disabling state. With this structure, the security level can be made higher.

According to yet another aspect of the present invention, there is provided a semiconductor device including: a plurality of memory regions that include non-volatile memory cells; a plurality of disabling information memory units that correspond to the memory regions, each of the disabling information memory units storing program disabling information indicating whether programming is to be disabled or enabled in each corresponding memory region; an input terminal that inputs auxiliary program disabling information indicating whether a change of the program disabling information from a program enabling state and to a program disabling state for a corresponding memory unit is allowed; and a disabling information control circuit that allows or does not allow a change of the program disabling information from the program enabling state to the program disabling state for the corresponding memory region in accordance with the auxiliary program disabling information when auxiliary information nullifying information indicating whether the auxiliary program disabling information is to be nullified or validated indicates that the auxiliary program disabling information is valid, the disabling information control circuit allowing a change of the program disabling information from the program enabling state to the program disabling state for the corresponding memory region, regardless of the auxiliary program disabling information, when the auxiliary information nullifying information indicates that the auxiliary program disabling information is invalid. Thus, the semiconductor device can determine whether the auxiliary program disabling information input to the input terminal should be used as the condition for switching the program disabling information to a program disabling state.

The above semiconductor device may further include an auxiliary information nullifying information memory unit that stores the auxiliary information nullifying information.

The semiconductor device may be configured to that the disabling information control circuit prohibits a change of the program disabling information from the program disabling state to the program enabling state for the corresponding memory region, after the program disabling information is switched to the program disabling state for the corresponding memory state in accordance with ROM information indicating whether to prohibit a change of the program disabling information from the program disabling state to the program enabling state for the corresponding memory region. With this structure, the security level can be made higher.

The semiconductor device may be configured so that, when ROM information indicating whether to prohibit a change of the program disabling information from the program disabling state to the program enabling state for the corresponding memory region indicates that the change from the program disabling state to the program enabling state is not prohibited, a change of the program disabling information from the program enabling state to the program disabling state is allowed or not allowed in accordance with the auxiliary program disabling information, regardless of the auxiliary information nullifying information. With this structure, the security level can be made even higher.

The semiconductor device may be configured so that the disabling information memory units and the auxiliary information nullifying information memory unit use different commands from each other. With this structure, each of the disabling information memory units and the auxiliary information nullifying information memory unit can be controlled independently of each other, and falsification (rewriting) of the auxiliary information nullifying information can be more strictly prohibited.

The semiconductor device may be configured so that an erasing unit for erasing the program disabling information in the disabling information memory units is different from an erasing unit for erasing the auxiliary information nullifying information in the auxiliary information nullifying information memory unit. With this structure, simultaneous erasing of the program disabling information and the auxiliary information nullifying information can be prevented, and a non-volatile memory with higher security can be provided.

According to a further aspect of the present invention, there is provided a method of controlling a semiconductor device that has a plurality of memory regions including a plurality of non-volatile memory cells, the method comprising the steps of: inputting auxiliary program disabling information indicating whether to allow a change of program disabling information from a program enabling state to a program disabling state, the program disabling information indicating whether programming is to be disabled or enabled in each corresponding memory region; and allowing or not allowing a change of the program disabling information from the program enabling state to the program disabling state for the corresponding memory region when the auxiliary program disabling information is valid in accordance with auxiliary information nullifying information indicating whether the auxiliary program disabling information is to be nullified or validated, and allowing a change of the program disabling information from the program enabling state to the program disabling state for the corresponding memory region, regardless of the auxiliary program disabling information, when the auxiliary information nullifying information indicates that the auxiliary program disabling information is invalid. Thus, the semiconductor device can determine whether the auxiliary program disabling information input to the input terminal should be used as the condition for switching the program disabling information to a program disabling state.

The method may further include the step of prohibiting a change of the program disabling information from the program disabling state to the program enabling state, after the program disabling information is switched to the program disabling state in accordance with ROM information indicating whether to prohibit a change of the program disabling information from the program disabling state to the program enabling state for the corresponding memory region. With this structure, the security level can be made higher.

According to a still further aspect of the present invention, there is provided a semiconductor device including: a plurality of memory regions that include non-volatile memory cells; a plurality of disabling information memory units that correspond to the memory regions, each of the disabling information memory units storing program disabling information indicating whether programming is to be disabled or enabled in each corresponding memory region; a disabling information control circuit that prohibits a change of the program disabling information from a program disabling state to a program enabling state, after the program disabling information is switched to the program disabling state; and a group erasing control circuit that performs erasing collectively in the memory regions in accordance with group erasing information, the group erasing control circuit nullifying or validating the group erasing information in accordance with group erasing nullifying information indicating whether the group erasing information is to be nullified or validated. In this semiconductor device, the function of prohibiting a change of the program disabling information from a program disabling state to a program enabling state can be achieved together with the function of performing collective erasing in the memory regions, after the program disabling information is switched to a program disabling state.

The above semiconductor device may further include a group erasing nullifying information memory unit that stores the group erasing nullifying information.

The semiconductor device may be configured so that the disabling information control circuit outputs the group erasing nullifying information for nullifying the group erasing information to the group erasing control circuit, when at least one piece of the program disabling information is switched to a program disabling state. With this structure, inconsistency can be prevented between the function of prohibiting a change of the program disabling information from a program disabling state to a program enabling state and the function of performing collective erasing in the memory regions, after the program disabling information is switched to a program disabling state.

The semiconductor device may be configured so that: the memory regions are divided into a plurality of groups; collective erasing can be performed in each of the groups of memory regions; and the number of pieces of the group erasing information is the same as the number of the groups. With this structure, collective erasing by the group can be performed.

The semiconductor device may be configured so that the disabling information control circuit outputs the group erasing nullifying information for nullifying the group erasing information as to one of the groups to the group erasing control circuit, when programming is disabled in the disabling information memory unit corresponding to at least one of the memory regions in the one of the groups. With this structure, only the collective erasing in the group containing a program-disabled memory region can be nullified.

The semiconductor device may be configured so that the disabling information memory units and the group erasing nullifying information memory unit use different commands from each other. With this structure, each of the disabling information memory units and the group erasing nullifying information memory unit can be controlled independently of each other, and falsification (rewriting) of the group erasing nullifying information can be more strictly prohibited.

The semiconductor device may be configured so that an erasing unit for erasing the program disabling information in the disabling information memory units is different from an erasing unit for erasing the group erasing nullifying information in the group erasing nullifying information memory unit. With this structure, simultaneous erasing of the program disabling information and the group erasing nullifying information can be prevented, and a non-volatile memory with higher security can be provided.

According to another aspect of the present invention, there is provided a method of controlling a semiconductor device that has a plurality of memory regions including non-volatile memory cells, the method comprising the steps of: prohibiting a change of program disabling information from a program disabling state to a program enabling state, after the program disabling information is switched to the program disabling state, the program disabling information indicating whether programming is to be disabled or enabled in each corresponding memory region; performing erasing collectively in the memory regions in accordance with group erasing information indicating collective erasing in the memory regions; and nullifying or validating the group erasing information. Thus, the function of prohibiting a change of the program disabling information from a program disabling state to a program enabling state can be achieved together with the function of performing collective erasing in the memory regions, after the program disabling information is switched to a program disabling state.

The method may be configured so that the group erasing information is nullified when at least one piece of the program disabling information is switched to the program disabling state.

The present invention provides a semiconductor device that can disable programming in more than one memory region at once and has a smaller circuit area. The present invention also provides a method of controlling such a semiconductor device. The present invention further provides a semiconductor device that can determine whether to use the application of a high potential to the auxiliary input terminal as the requirement for switching the program disabling information to a program disabling state. The present invention also provides a method of controlling such a semiconductor device. The present invention further provides a semiconductor device that can have the STB function and the collecting erasing function cooperating with each other. The present invention also provides a method of controlling such a semiconductor device.

BRIEF DESCRIPTION OF THE DRAWINGS

Other objects, features and advantages of the present invention will become more apparent from the following detailed description when read in conjunction with the accompanying drawings, in which:

FIG. 5 illustrates the operation of the program disabling information selection circuit of the non-volatile memory in accordance with the first embodiment;

FIG. 11 illustrates the operation to be performed when programming is performed in a WPCAM in the non-volatile memory in accordance with the second embodiment;

DESCRIPTION OF THE PREFERRED EMBODIMENTS

The following is a description of embodiments of the present invention, with reference to the accompanying drawings.

First Embodiment

Figure 1:
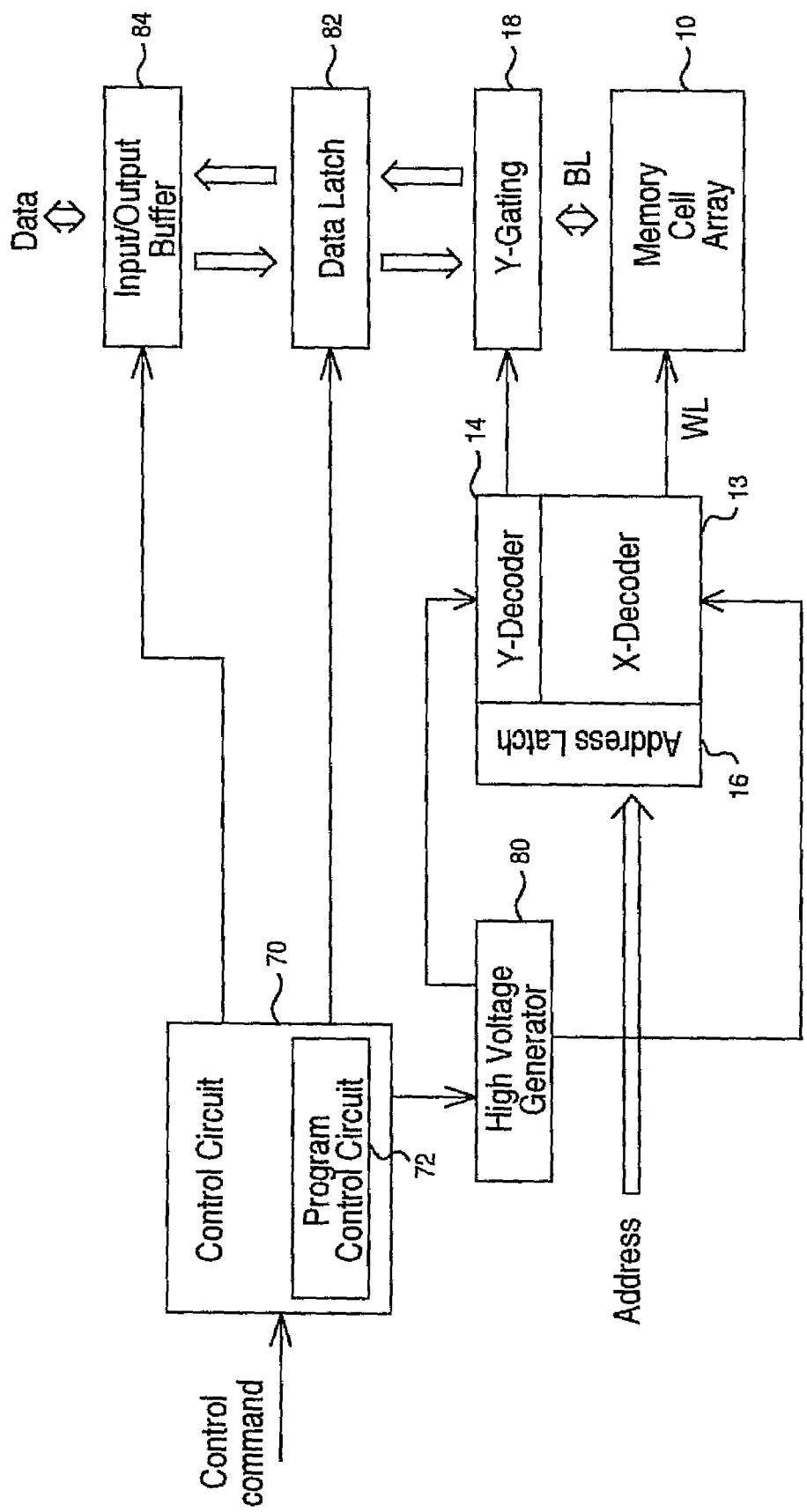
FIG. 1 is a block diagram of a non-volatile memory in accordance with a first embodiment of the present invention.

A first embodiment of the present invention is an example of a non-volatile memory that has a STB function and a function of collectively turning memory regions 12 into ROMs. FIG. 1 is a block diagram of the non-volatile memory in accordance with the first embodiment. In a memory cell array 10, non-volatile memory cells that are connected to word lines WL and bit lines BL are arranged in a matrix fashion. In accordance with an address signal that is input to an address latch 16 from an external circuit, an X-decoder 13 selects a word line WL, and a Y-decoder 14 selects a bit line BL via a Y-gate 18. Data that is to be output to an external circuit through an input/output buffer 84 or data that is input from an external circuit to the input/output buffer 84 are latched by a data latch 82. The data is written in or read from the memory cell connected to the bit line BL selected by the Y-gate 18 and the word line WL selected by the X-decoder 13. In accordance with a control command that is input from an external circuit to a control circuit 70, a program control circuit 72 provided in the control circuit 70 controls the input/output buffer 84 and the data latch 82. Also, the program control circuit 72 controls a high voltage generator 80. The high voltage generator 80 supplies a high voltage for writing data into or reading data from the memory cells via the Y-decoder 14 and the X-decoder 13.

Figure 2:
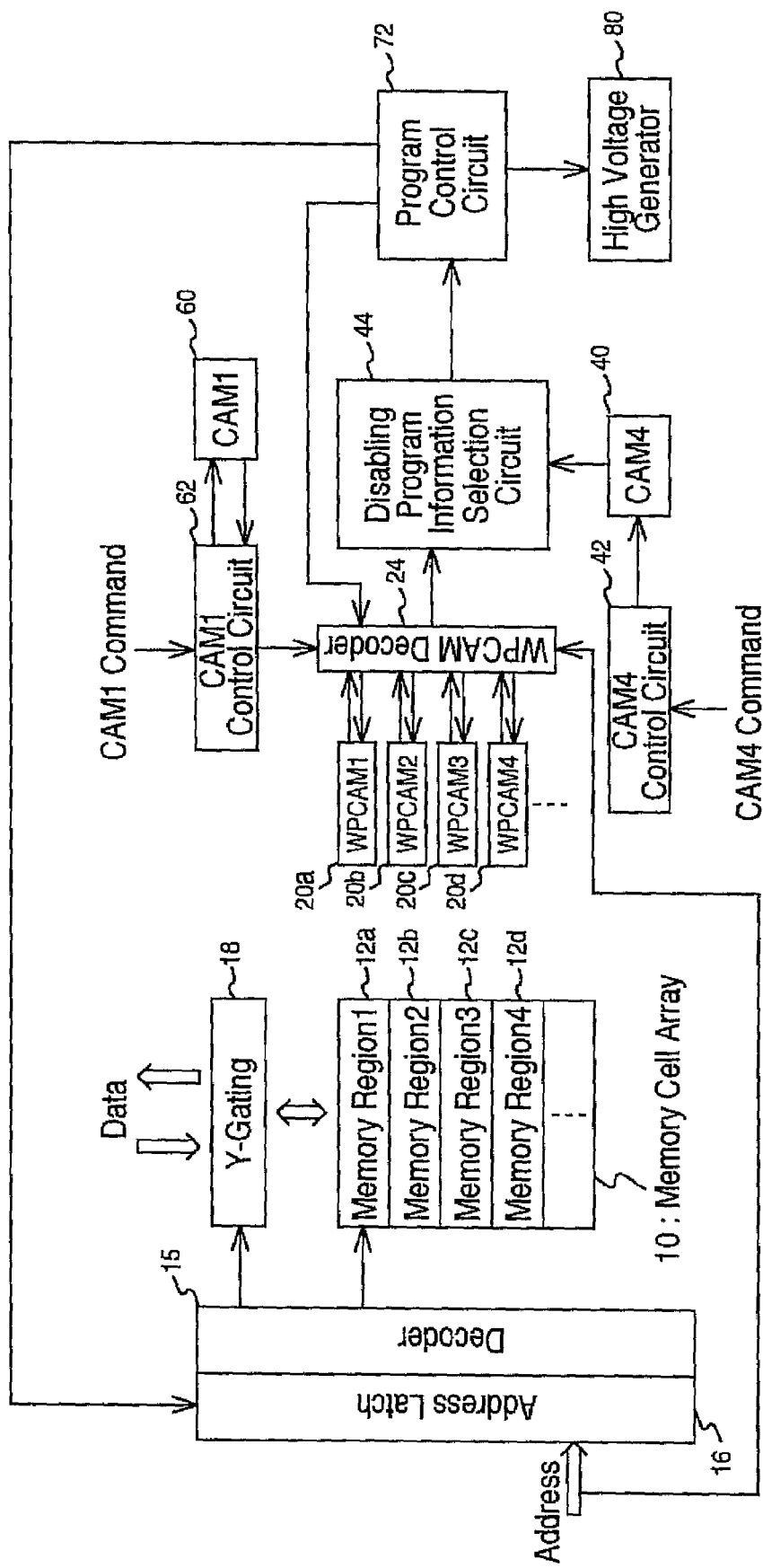
FIG. 2 is a block diagram showing the WPCAMs in the non-volatile memory in accordance with the first embodiment.

FIG. 2 is a block diagram concerning WPCAMs (Write Protect Content Addressable Memories) that are program disabling information memory units in the non-volatile memory in accordance with the first embodiment. The memory cell array 10 has memory regions (12a, 12b, 12c, 12d, ...). The memory regions 12 have sectors including non-volatile memory cells. A decoder 15 includes the X-decoder 13 and the Y-decoder 14. WPCAMs (20a, 20b, 20c, 20d, ...) are provided for the respective memory regions (12a, 12b, 12c, 12d, ...). In each of the WPCAMs 20, first program disabling information (WPCAM data) indicating whether programming should be disabled in the corresponding memory region 12 is recorded.

A WPCAM decoder 24 for decoding the WPCAMs 20 is connected to the WPCAMs 20. More specifically, the WPCAM decoder 24 selects a WPCAM 20 when WPCAM data is to be written into or read from the WPCAM 20. The WPCAM data that is read from the selected WPCAM 20 is output to the program control circuit 72 via a program disabling information selection circuit 44. In the program disabling information selection circuit 44, collective program disabling information (CAM4 data) indicating whether programming should be disabled collectively in the memory regions 12 is input from a CAM4 40. Based on the WPCAM data and the CAM4 data, the program disabling information selection circuit 44 outputs second program disabling information to the program control circuit 72. Based on the second program disabling information, the program control circuit 72 controls the address latch 16 and the high voltage generator 80. A CAM4 control circuit 42 receives a CAM4 command, and writes the CAM4 data into the CAM4 40.

A CAM1 60 is a ROM information memory unit for the STB function. In a case where programming is disabled in the memory region 12 corresponding to the WPCAM data (the first program disabling information), the ROM information (CAM1 data) indicating whether a change from "program disabling" to "program enabling" as to the memory region 12 corresponding to the WPCAM data should be prohibited thereafter is recorded in the CAM1 60. A CAM1 control circuit 62 receives a CAM1 command, and writes the CAM1 data in the CAM1 60. The CAM1 control circuit 62 also controls the WPCAM decoder 24 to control the reading of the WPCAM data from the WPCAMs 20.

Figure 3:
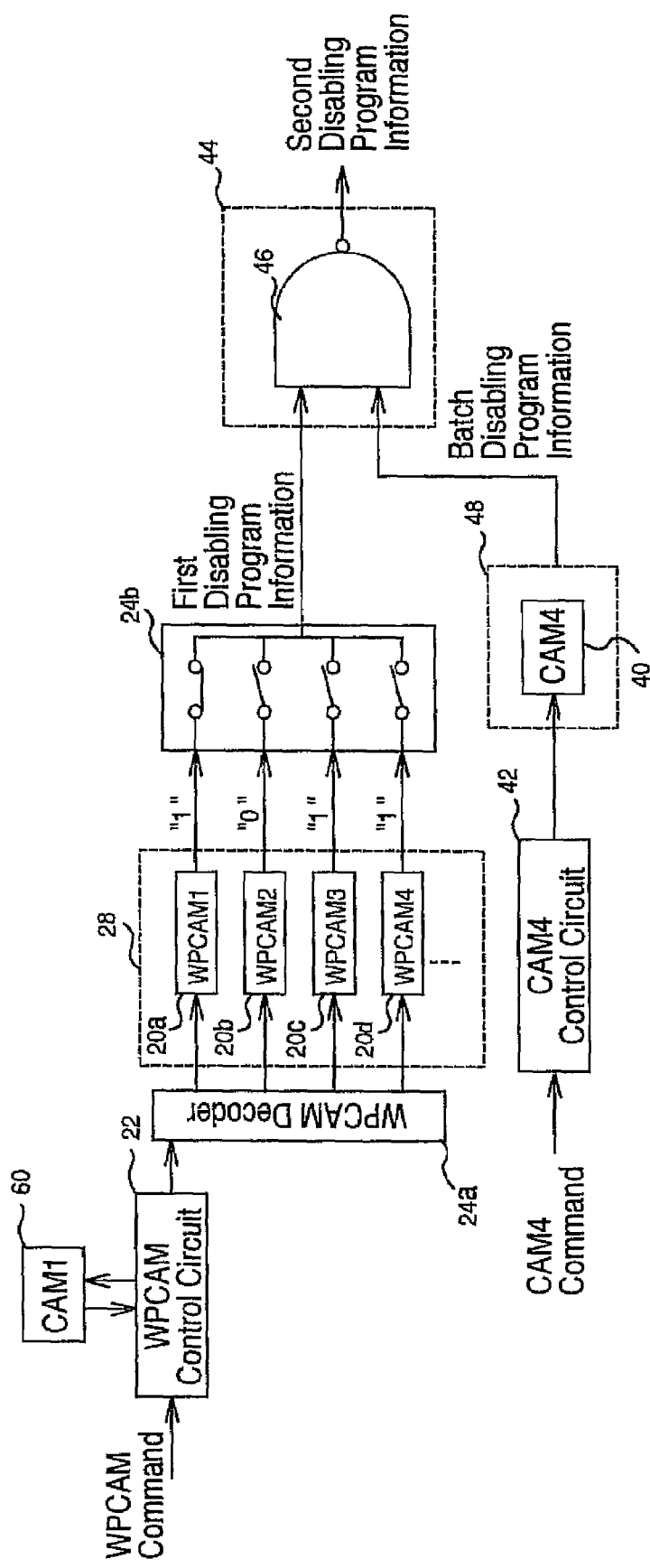
FIG. 3 is a block diagram illustrating the WPCAMs and the program disabling information selection circuit of the non-volatile memory in accordance with the first embodiment.

FIG. 3 is a block diagram illustrating the WPCAMs 20 and the program disabling information selection circuit 44. The same components as those shown in FIG. 2 are denoted by the same reference numerals as those in FIG. 2, and explanation of them is omitted herein. A WPCAM command is input to a WPCAM control circuit 22. The WPCAM control circuit 22 writes the WPCAM data into the WPCAMs 20 via the WPCAM decoder 24a. The program disabling information selection circuit 44 has a NAND circuit 46. CAM4 data (collective program disabling information) of a CAM4 40 and the WPCAM data (the first program disabling information) of the WPCAMs 20 are input to the NAND circuit 46. The output of the NAND circuit 46 is the second program disabling information. The WPCAMs 20 and the CAM4 40 are formed in p-type wells 28 and 48 in a semiconductor substrate.

Figure 4:
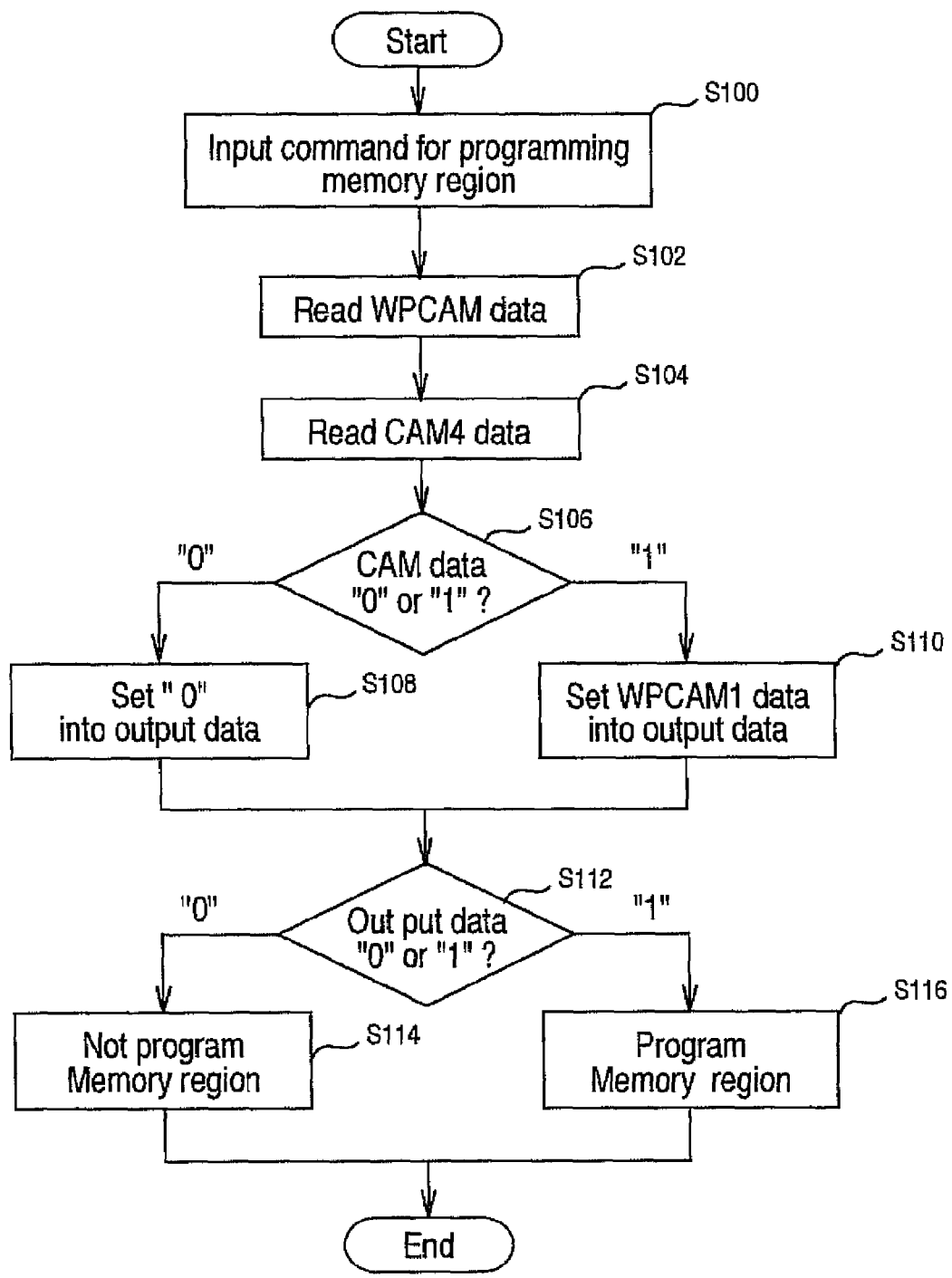
FIG. 4 is a flowchart of the operation to be performed when programming is performed in a memory region in the non-volatile memory in accordance with the first embodiment.

FIG. 4 is a flowchart of the operation of programming the memory region 12a of the non-volatile memory in accordance with the first embodiment. FIG. 5 illustrates the operation of the program disabling information selection circuit 44.

As shown in FIG. 4, a command for programming the memory region 12a is input to the control circuit 70 (step S100). The program control circuit 72 controls the WPCAM decoder 24, and outputs the WPCAM data (the first program disabling information) of the corresponding WPCAM 20 to the program disabling information selection circuit 44. Accordingly, the program disabling information selection circuit 44 reads the WPCAM data (step S102). The CAM4 40 outputs the CAM4 data (the collective program disabling information) to the program disabling information selection circuit 44. Thus, the program disabling information selection circuit 44 reads the CAM4 data (step S104). The procedures of step S102 and step S104 may be reversed.

As shown in FIG. 5, if the first program disabling information (the WPCAM data) is "0", programming is disabled in the corresponding memory region 12. If the WPCAM data is "1", programming is enabled in the corresponding memory region 12. If the collective program disabling information (CAM4 data) is "0", programming is disabled in all the memory regions 12. If the CAM4 data is "1", programming is not disabled collectively. If the second program disabling information (the output of the program disabling information selection circuit 44) is "0", the program control circuit 72 disables programming in the corresponding memory region 12. If the second program disabling information is "1", the program control circuit 72 does not disable the programming in the corresponding memory region 12 but enables programming in the corresponding memory region 12.

Referring back to FIG. 4, the program disabling information selection circuit 44 determines whether the CAM4 data is "0" or "1" (step S106). If the CAM4 data is "0", the output data (the second program disabling information) is set as "0" (step S108). As shown in FIG. 5, when the CAM4 data is "0", the output data is always "0", regardless of the WPCAM data. Referring back to FIG. 4, if the CAM4 data is determined to be "1" in step S106, the WPCAM data is set as the output data (step S110). As shown in FIG. 5, when the CAM4 data is "1", the output data is the same as the WPCAM data.

Referring back to FIG. 4, the program control circuit 72 determines whether the output data of the program disabling information selection circuit 44 is "0" or "1" (step S112). If the output data is "0", the program control circuit 72 does not perform programming in the corresponding memory region 12 (step S114). If the output data is "1", the program control circuit 72 performs programming in the corresponding memory region 12 (step S116).

In the first embodiment, if collective programming is to be disabled based on the CAM4 data (the collective program disabling information) indicating whether collectively programming should be disabled in the memory regions 12, the program disabling information selection circuit 44 outputs the second program disabling information for disabling programming in the corresponding memory region 12, regardless of the WPCAM data (the first program disabling information). If collective programming is not to be disabled, the program disabling information selection circuit 44 outputs the WPCAM data as the second program disabling information. Based on the second program disabling information, the program control circuit 72 disables or enables programming of the corresponding memory region 12. Through this control operation, programming can be disabled in two or more memory regions at once. Unlike by the technique disclosed in Patent Document 1 by which program disabling information is output to the WPCAMs 20 (the disabling information memories) from latch circuits, the circuit size can be reduced without two or more latch circuits. Also, an increase in programming time due to the variation in programming time among the latch circuits to which information is input can be prevented.

The non-volatile memory in accordance with the first embodiment further includes the CAM4 40 (the collective disabling information memory unit) that stores the CAM4 data (the collective program disabling information). The WPCAM command to be input to the WPCAM control circuit 22 for controlling the WPCAMs 20 shown in FIG. 3 is different from the CAM4 command to be input to the CAM4 control circuit 42 for controlling the CAM4 40. In other words, each WPCAM 20 and the CAM4 40 use different commands from each other. Accordingly, the CAM4 40 and each WPCAM 20 is controlled independently of each other, and rewrite of the CAM4 data in the CAM4 by a hacker or the like can be prevented.

Furthermore, the WPCAMs 20 and the CAM4 40 are formed in the different wells 28 and 48 in the semiconductor substrate on which the non-volatile memory cells are formed. In a case where data erasing in the WPCAMs 20 and the CAM4 40 is performed through a FN tunneling phenomenon caused by applying a voltage between the control gate and the wells, the WPCAM data and the CAM4 data might be erased at the same time if the wells 28 and 48 for the WPCAMs 20 and the CAM4 40 are the same. The wells 28 and 48 that serve as erasing units are made independent of each other in the first embodiment, so that simultaneous erasing of the WPCAM data and the CAM4 data can be prevented. Thus, a non-volatile memory with high security can be obtained.

The above described is an example structure in which different wells 28 and 48 are formed in the semiconductor substrate so as to provide different erasing units for the WPCAM data and the CAM4 data. The erasing units may be made different from each other by employing physically different structures for erasing data, such as providing different high-voltage generating circuits. Also, different data erasing methods may be utilized. For example, a FN tunneling phenomenon may be utilized by one erasing method, while hot hole injection may be carried out by the other erasing method. To make the data erasing units different from each other is to employ physically different structures for erasing data or utilize different data erasing methods. By doing so, simultaneous erasing of the WPCAM data and the CAM4 data can be prevented, and a non-volatile memory with high security can be produced.

Figure 6:
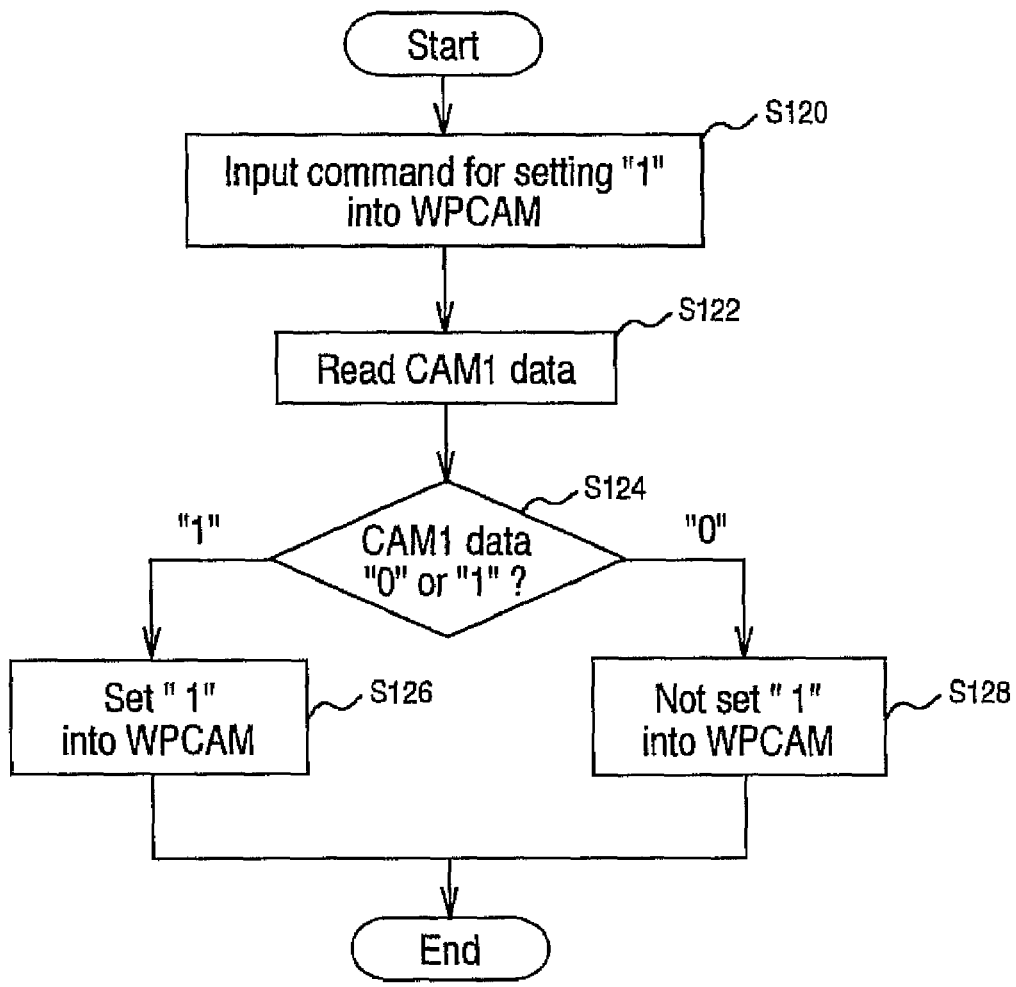
FIG. 6 is a flowchart of the operation to be performed when a memory region in the non-volatile memory is switched from a program disabled state to a program enabled state in accordance with the first embodiment.

Next, the STB function in accordance with the first embodiment is described. FIG. 6 is a flowchart of the operation to be performed in a case where the WPCAM data of the designated WPCAM 20 corresponding to a program-disabled memory region 12 is changed from "0" (a written state) to "1" (an erased state). Programming is enabled in each memory region 12 corresponding to a WPCAM 20 in which "1" is set. A command for setting "1" as the WPCAM data in the WPCAM 20 designated by the WPCAM control circuit 22 is input (step S120). The WPCAM control circuit 22 reads the CAM1 data (the ROM information) from the CAM1 60 via the CAM1 control circuit 62 (step S122). The WPCAM control circuit 22 determines whether the CAM1 data is "0" or "1" (step S124). If the CAM1 data is "1", "1" is set as the WPCAM data in the designated WPCAM 20 (step S126). Thus, programming is enabled in the memory region 12 corresponding to the designated WPCAM 20. If the CAM1 data is determined to be "0" in step S124, "1" is not set as the WPCAM data in the designated WPCAM 20 (step S128). Thus, programming remains disabled in the memory region 12 corresponding to the designated WPCAM 20.

Figure 7:
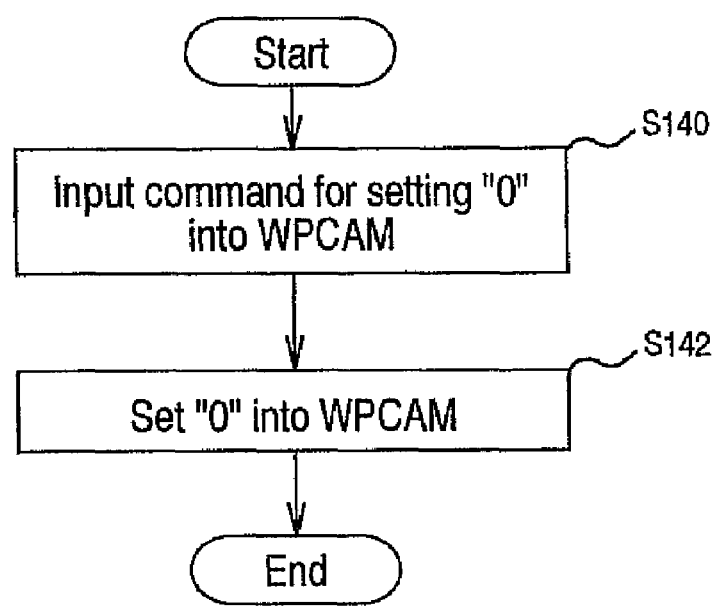
FIG. 7 is a flowchart of the operation to be performed when a memory region in the non-volatile memory is switched from a program enabled state to a program disabled state in accordance with the first embodiment.

FIG. 7 is a flowchart of the operation to be performed in a case where "0" (program disabling) is set as the WPCAM data in the designated WPCAM 20 corresponding to a program-enabled memory region 12. A command for setting "0" as the WPCAM data in the WPCAM 20 designated by the WPCAM control circuit 22 is input (step S140). Regardless of the CAM1 data, "0" is set as the WPCAM data in the designated WPCAM 20 (step S142). In this case, the WPCAM data in the designated WPCAM 20 is made "0", regardless of the CAM1 data.

In the first embodiment, if the CAM1 data is "1" and the WPCAM data in a WPCAM 20 represents "program disabling" as to the corresponding memory region 12, the WPCAM control circuit 22 (the disabling information control circuit) prohibits a change of the WPCAM data from "program disabling" to "program enabling" thereafter, based on the CAM1 data (the ROM information), as shown in FIG. 6. As in step S128, even if a WPCAM command for setting "1" as the WPCAM data in the designated WPCAM 20 is input, the WPCAM data is not changed to "1". In this manner, programming in the memory region 12 corresponding to the designated WPCAM 20 remains disabled. Thus, the corresponding memory region 12 can be caused to function as a ROM, and higher security can be achieved.

As described above, the function of collectively disabling programming in the memory regions 12 is provided in the non-volatile memory in which each of the memory regions 12 can be caused to function as a ROM. With this function, all the memory regions 12 can be caused to function as ROMs in an early stage, and higher security can be achieved.

Although the case where the WPCAM data (the first program disabling information) represents "program disabling" has been described in the above, the ROM information (the CAM1 data) may function to enable WPCAM data writing but disable data erasing in a modification of the first embodiment. More specifically, when the CAM1 data is "0", the WPCAM data is allowed to change from an erased state "1" to a written state "0". However, a change of the WPCAM data from a programmed state "0" to an erased state "1" is prohibited by the ROM information (the CAM1 data). Accordingly, after necessary data writing is performed onto a given memory region 12, the WPCAM data corresponding to the given memory region 12 is caused to represent a written state. In this manner, the memory regions 12 are successively turned into ROMs. Depending on the applications for controlling the non-volatile memory, the functions of the ROM information (the STB function) can be widely varied.

Second Embodiment

Figure 8:
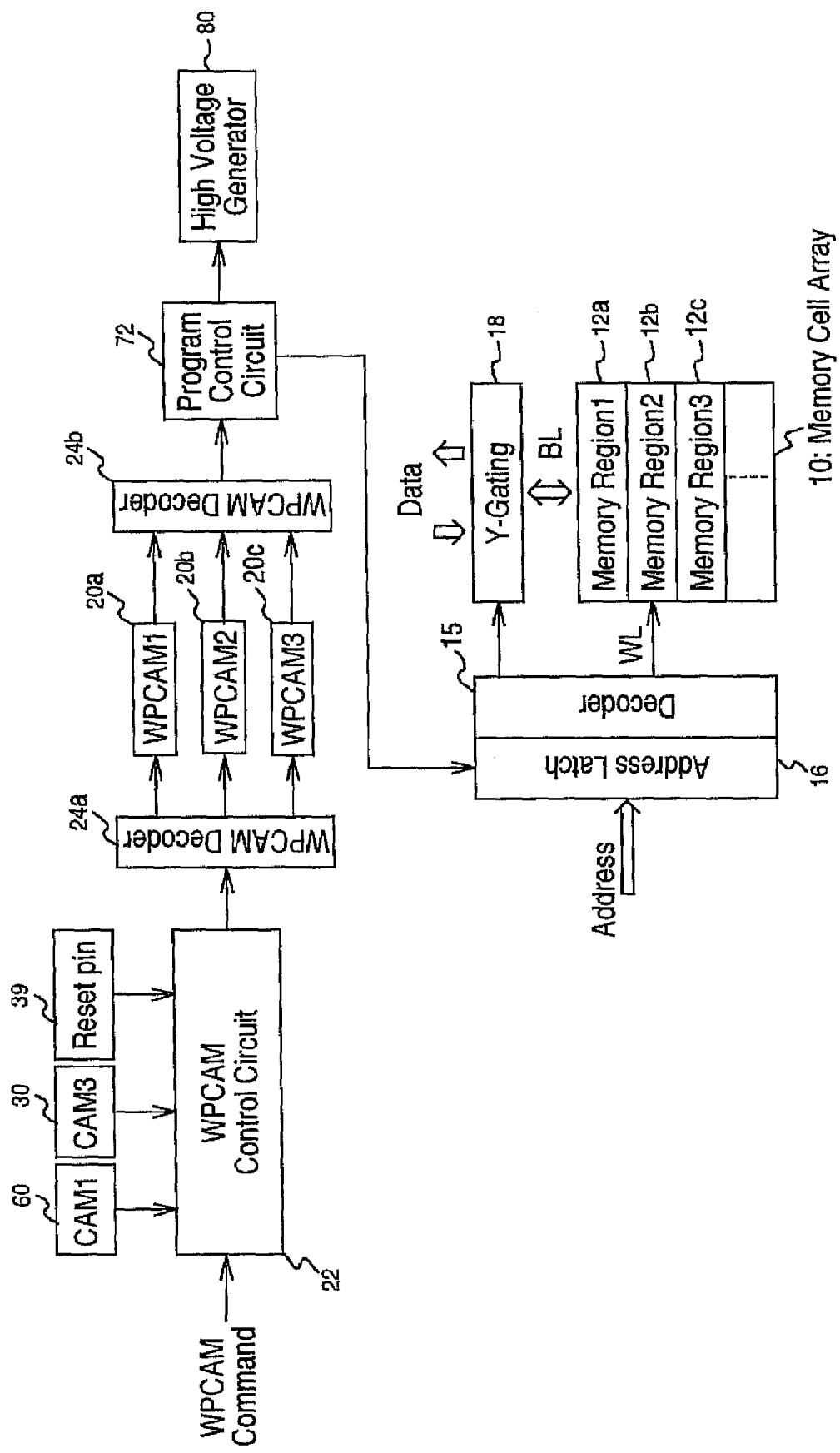
FIG. 8 is a block diagram showing the WPCAMs of a non-volatile memory in accordance with a second embodiment of the present invention.

A second embodiment is an example of a non-volatile memory that has a STB function and an auxiliary input terminal to which a high voltage is to be applied. The entire structure of the non-volatile memory illustrated in a block diagram should be the same as that illustrated in FIG. 1. The same components as those shown in FIG. 1 are denoted by the same reference numerals as those in FIG. 1, and explanation of them is omitted herein. FIG. 8 is a block diagram showing the WPCAMs (Write Protect Content Addressable Memories) that are the disabling information memory units in the non-volatile memory in accordance with the second embodiment. A memory cell array 10 includes memory regions (12a, 12b, 12c, ...). The memory regions 12 have sectors including non-volatile memory cells. A decoder 15 includes an X-decoder 13 and a Y-decoder 14. WPCAMs (20a, 20b, 20c, ...) are provided for the respective memory regions (12a, 12b, 12c, ...). In each of the WPCAMs 20, program disabling information (WPCAM data) indicating whether programming should be disabled in the corresponding memory region 12 is recorded.

WPCAM decoders 24a and 24b for decoding the WPCAMs 20 are connected to the WPCAMs 20. A WPCAM command is input to a WPCAM control circuit 22. A CAM1 60, a CAM3 30, and a reset pin 39 are connected to the WPCAM control circuit 22. In accordance with the WPCAM command and data supplied from the CAM1 60, the CAM3 30, and the reset pin 39, programming is performed in the WPCAMs 20 via the WPCAM decoder 24a.

A CAM1 60 is a ROM information memory unit for the STB function. In a case where programming is disabled in the memory region 12 corresponding to the WPCAM data (the first program disabling information), the ROM information (CAM1 data) indicating whether a change from "program disabling" to "program enabling" as to the memory region 12 corresponding to the WPCAM data should be prohibited thereafter is recorded in the CAM1 60. The reset pin 39 is the auxiliary input terminal (or referred to simply as the input terminal) to which auxiliary program disabling information (reset pin data) indicating whether a change from "program enabling" to "program disabling" as to the memory region 12 corresponding to the WPCAM data (the program disabling information) should be allowed is input. In the second embodiment, a higher voltage than the external source voltage is applied to the reset pin 39. Therefore, a high-voltage determining circuit (not shown) for determining whether a high voltage is applied is connected to the reset pin 39. The high-voltage determining circuit determines whether a high voltage is applied to the reset pin 39, and outputs the auxiliary program disabling information (the reset pin data). The CAM3 30 is an auxiliary information nullifying information memory unit of a non-volatile type that stores auxiliary information nullifying information (CAM3 data) indicating whether the reset pin data should be nullified or validated.

When programming is to be performed in a memory region 12, the WPCAM data (the program disabling information) of the corresponding WPCAM 20 is read into a program control circuit 72 via the WPCAM decoder 24b. In a case where the WPCAM data represents "program disabling" as to the corresponding memory region 12 (or in a case where the WPCAM data is "0" representing a written state), programming is not performed on the corresponding memory region 12. In a case where the WPCAM data represents "program enabling" (or in a case where the WPCAM data is "1" representing an erased state), programming is performed on the corresponding memory region 12. Therefore, the program control circuit 72 controls an address latch 16 and a high voltage generator 80.

Figure 9:
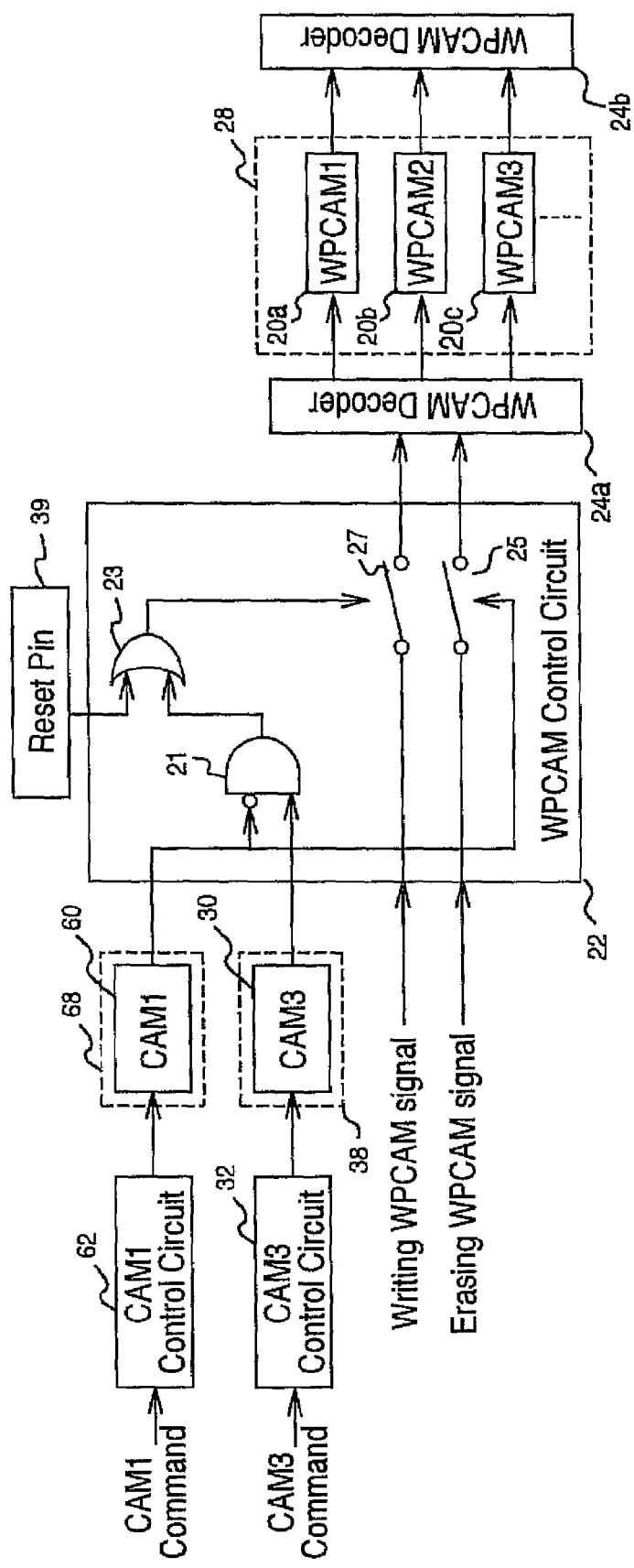
FIG. 9 is a block diagram illustrating the WPCAM control circuit and its surroundings in the non-volatile memory in accordance with the second embodiment.

FIG. 9 is a block diagram showing the WPCAM control circuit 22 and its surroundings in detail. The same components as those shown in FIG. 8 are denoted by the same reference numerals as those in FIG. 8, and explanation of them is omitted herein. The WPCAM control circuit 22 includes switches 25 and 27. A WPCAM writing signal and a WPCAM erasing signal that are input to the WPCAM control circuit 22 are output to the WPCAM decoder 24a via the switches 27 and 25, respectively. The WPCAM decoder 24a then performs writing or erasing on the selected WPCAM 20. In accordance with a CAM1 command, a CAM1 control circuit 62 performs programming on the CAM1 60. In accordance with a CAM3 command, a CAM3 control circuit 32 performs programming on the CAM3 30. The CAM1 60 and the CAM3 30 are formed in p-type wells 68 and 38, respectively. The p-type wells 68 and 38 are formed in the semiconductor substrate, and can be made independent of the p-type well 28 in which the WPCAMs 20 are formed.

Auxiliary signals of the CAM3 data (the auxiliary information nullifying information) in the CAM3 30 and the CAM1 data (the ROM information) in the CAM1 60 are input to an AND circuit 21. The output of the AND circuit 21 and the reset pin 39 are input to an OR circuit 23. The output of the OR circuit 23 controls the switch 27. The data of the CAM1 60 controls the switch 25.

Figure 10:
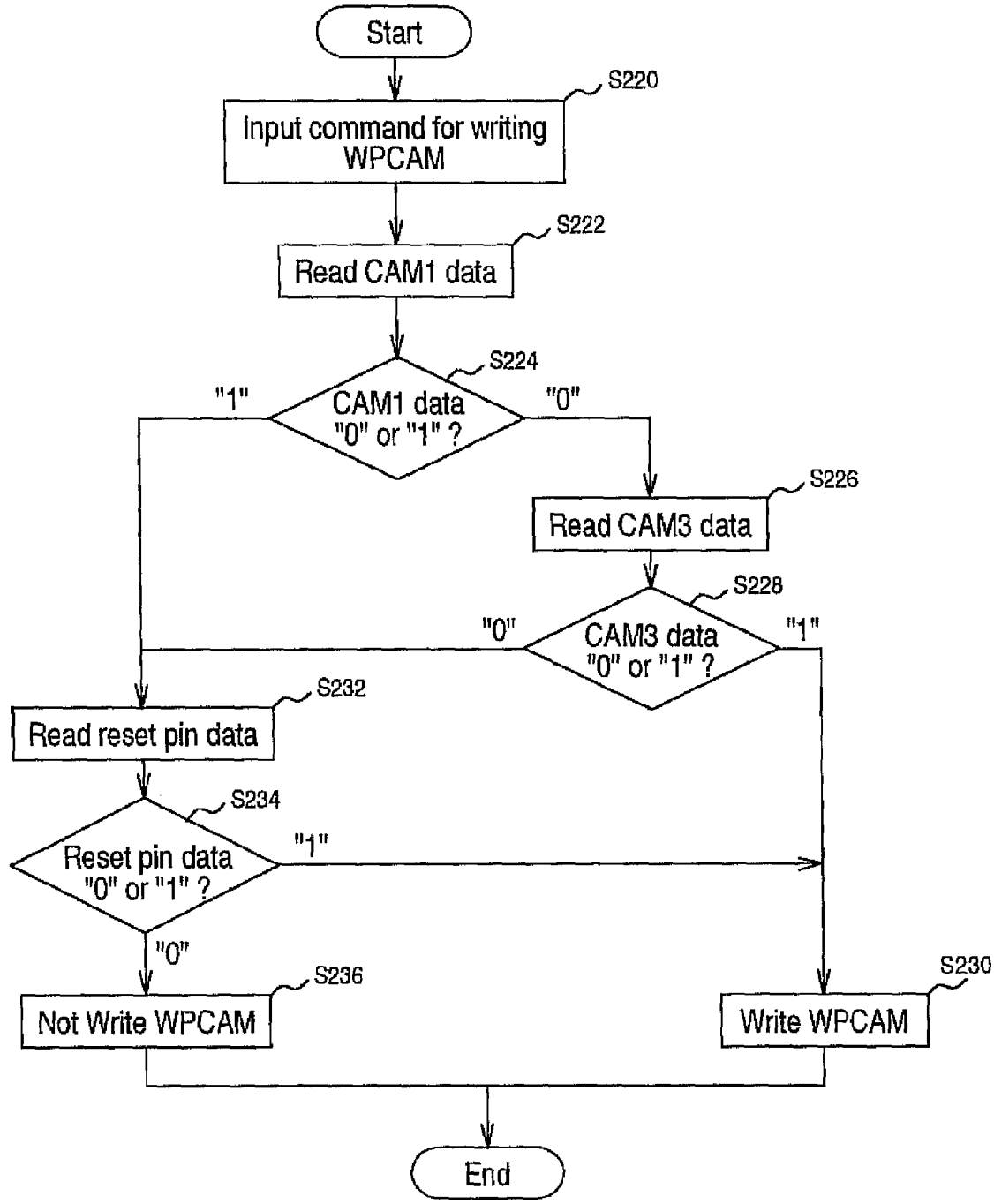
FIG. 10 is a flowchart of the operation to be performed when programming is performed in a WPCAM in the non-volatile memory in accordance with the second embodiment.

FIG. 10 is a flowchart of the operation to be performed in a case where writing is performed on a WPCAM 20 (or in a case where the corresponding memory region 12 is switched from a program enabled state to a program disabled state). FIG. 11 illustrates the operation to be performed by the WPCAM control circuit 22 in such a case.

As shown in FIGS. 9 and 10, a command for performing writing in a WPCAM 20 is input to the WPCAM control circuit 22 (step S220). The WPCAM control circuit 22 reads the CAM1 data (the ROM information) from the CAM1 60 (step S222). The WPCAM control circuit 22 determines whether the CAM1 data is "0" or "1" (step S224). If the CAM1 data is "0" (a written state), the WPCAM control circuit 22 reads the CAM3 data (the auxiliary information nullifying information) from the CAM3 30 (step S226). The WPCAM control circuit 22 then determines whether the CAM3 data is "0" or "1" (step S228). If the CAM3 data is "1" (an erased state), the WPCAM control circuit 22 turns on the switch 27 to enable writing in the WPCAM 20 (step S230).

If the CAM1 data is determined to be "1" (an erased state) in step S224, or if the CAM3 data is determined to be "0" (a written state) in step S228, the WPCAM control circuit 22 reads the reset pin data (the auxiliary program disabling information) from the reset pin 39 (step S232). If a high voltage (a voltage of 12V, for example) is applied to the reset pin 39, the reset pin data is "1". If not, the reset pin data is "0". The WPCAM control circuit 22 determines whether the reset pin data is "0" or "1" (step S234). If the reset pin data is "1", the WPCAM control circuit 22 turns on the switch 27, to enable writing in the WPCAM 20 (step S230). If the reset pin data is "0", the WPCAM control circuit 22 turns off the switch 27, not to enable writing in the WPCAM 20 (step S236).

In the case where the CAM1 data for activating the STB function is "0" (a written state), the condition for turning on the switch 27 and enabling writing in the WPCAM 20 depends on the CAM3 data (the auxiliary information nullifying information). If the CAM3 data is "1" (an erased state), the WPCAM control circuit 22 nullifies the reset pin data. If the CAM3 data is "0" (a written state), the WPCAM control circuit 22 validates the reset pin data.

The above described operation is summed up in FIG. 11. In the case where "the STB function is invalid (the CAM1 data being "1")" or in the case where "the STB function is valid (the CAM1 data being "0") and the auxiliary information nullifying information (the CAM3 data being "0")", if a voltage is applied to the reset pin 39 (or if the auxiliary program disabling information (the reset pin data) is "1"), the switch 27 is turned on when a signal for performing writing in the WPCAM 20 is input, and writing is performed on the WPCAM 20 accordingly. If a voltage is not applied to the reset pin 39 (or if the reset pin data is "0"), the switch 27 is turned off even though a signal for performing writing on the WPCAM 20 is input, and writing is not performed on the WPCAM 20 in principle. However, in the case where "the STB function is valid (the CAM1 data being "0") and the auxiliary information nullifying information is invalid (the CAM3 data being "1"), the switch 27 is turned on anomalistically, regardless of the auxiliary program disabling information (the reset pin data), and writing is performed on the WPCAM 20 when a signal for performing writing in the WPCAM 20 is input. In this manner, the auxiliary information nullifying information is nullified (or "1" is set as the CAM3 data) in the case where the STB function is valid (the CAM1 data being "0"), so that writing can be performed on the WPCAM 20 (or programming is disabled in the corresponding memory region 12) without high-voltage application to the reset pin 39.

Figure 12:
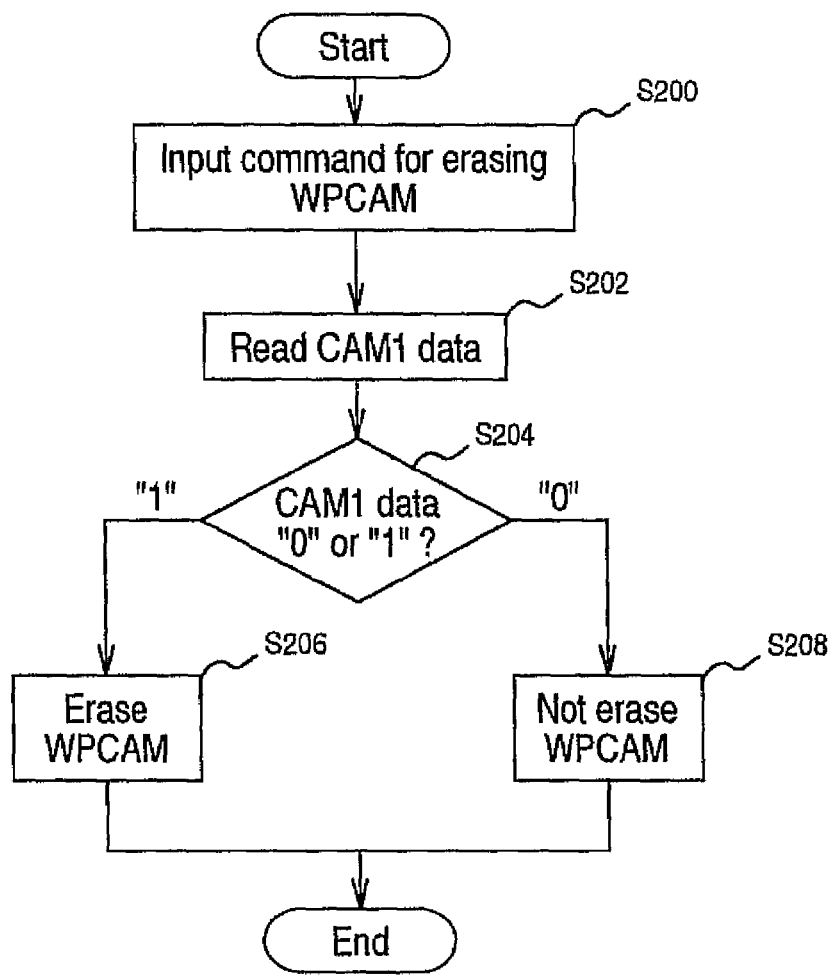
FIG. 12 is a flowchart of the operation to be performed when erasing is performed in a WPCAM in the non-volatile memory in accordance with the second embodiment.

FIG. 12 is a flowchart of the operation to be performed when erasing is performed on a WPCAM 20 (or when the corresponding memory region 12 is switched from a program disabled state to a program enabled state). As shown in FIGS. 9 and 12, the WPCAM control circuit 22 receives a command for performing erasing on the WPCAM 20 (step S200). The WPCAM control circuit 22 reads the CAM1 data from the CAM1 60 (step S202). The WPCAM control circuit 22 then determines whether the CAM1 data is "0" or "1" (step S204). If the CAM1 data is "1", the WPCAM control circuit 22 turns on the switch 25, to perform erasing on the WPCAM 20 (step S206). If the CAM1 data is "0", the WPCAM control circuit 22 turns off the switch 25, and does not perform erasing on the WPCAM 20 (step S208).

As described above, if the CAM1 data for inactivating the STB function is "1" (an erased state), the WPCAM control circuit 22 turns on the switch 25 to enable erasing in the WPCAM 20, regardless of the CAM3 data. In other words, the memory region 12 corresponding to the WPCAM data (the program disabling information) is switched from a program disabled state to a program enabled state. Meanwhile, if the CAM1 data for activating the STB function is "0" (a written state), the WPCAM control circuit 22 turns off the switch 25 not to enable erasing in the WPCAM 20, regardless of the CAM3 data. In other words, the memory region 12 corresponding to the WPCAM data (the program disabling information) can be switched only from a program enabled state to a program disabled state. Thus, the memory region 12 corresponding to the program disabling information is turned into a ROM. In this manner, when the CAM1 data is "0", writing of the WPCAM data into the WPCAM 20 can be performed only once.

In the non-volatile memory in accordance with the second embodiment, based on the CAM3 data (the auxiliary information nullifying information) indicating whether the reset pin data (the auxiliary program disabling information) should be nullified or validated, the WPCAM control circuit 22 (the disabling information control circuit) determines whether to allow a change from a program enabled state to a program disabled state in the memory region 12 corresponding to the program disabling information in accordance with the reset pin data, if the CAM3 data is valid ("0"), as shown in FIGS. 10 and 11. If the CAM3 data is invalid ("1"), the WPCAM control circuit 22 allows a change from a program enabled state to a program disabled state of the memory region 12 corresponding to the program disabling information, regardless of the reset pin data. In this manner, when the WPCAM data is changed from program enabling data to program disabling data, whether a signal is applied to the reset pin 39 can be selected or unselected as a condition. Here, the signal to be input to the reset pin 39 is not limited to a high voltage, as long as the reset pin 39 can serve as an input terminal for inputting the auxiliary program disabling information indicating whether a change of the WPCAM data from program enabling data to program disabling data should be allowed.

The second embodiment also includes the auxiliary information nullifying information memory unit (CAM3 30) that stores the CAM3 data (the auxiliary information nullifying information). With this arrangement, a non-volatile memory that satisfies each user's purpose of use can be provided by setting the CAM3 at the time of shipment from the factory.

Further, as shown in FIG. 12, in the case where CAM1 data is "0" and programming is disabled in the memory region 12 corresponding to the program disabling information in the WPCAM 20 in accordance with the CAM1 data (the ROM information), the WPCAM control circuit 22 prohibits a change from a program disabled state to a program enabled state thereafter in the memory region 12 corresponding to the program disabling information. Even if a command for performing erasing in the WPCAM 20 is input as in step S200, erasing is not performed in the WPCAM 20 (or "1" is not set as the WPCAM data) as in step S206. Accordingly, the memory region 12 corresponding to the WPCAM 20 remains program-disabled. Thus, the corresponding memory region 12 can be turned into a ROM, and higher security can be achieved.

Furthermore, as shown in FIGS. 10 and 11, in the case where a change of the CAM1 data (the ROM information) from program disabling data to program enabling data is not prohibited, a change from a program enabled state to a program disabled state in the memory region 12 corresponding to the program disabling information is allowed or prohibited based on the reset pin data (the auxiliary program disabling information), regardless of the CAM3 data (the auxiliary information nullifying information). In the case where the CAM1 data is "1", as shown in FIG. 11, the switch 27 is turned on when the reset pin data is "1", and the switch 27 is turned off when the reset pin data is "0", regardless of whether the CAM3 data is "0" or "1".

Figure 13:
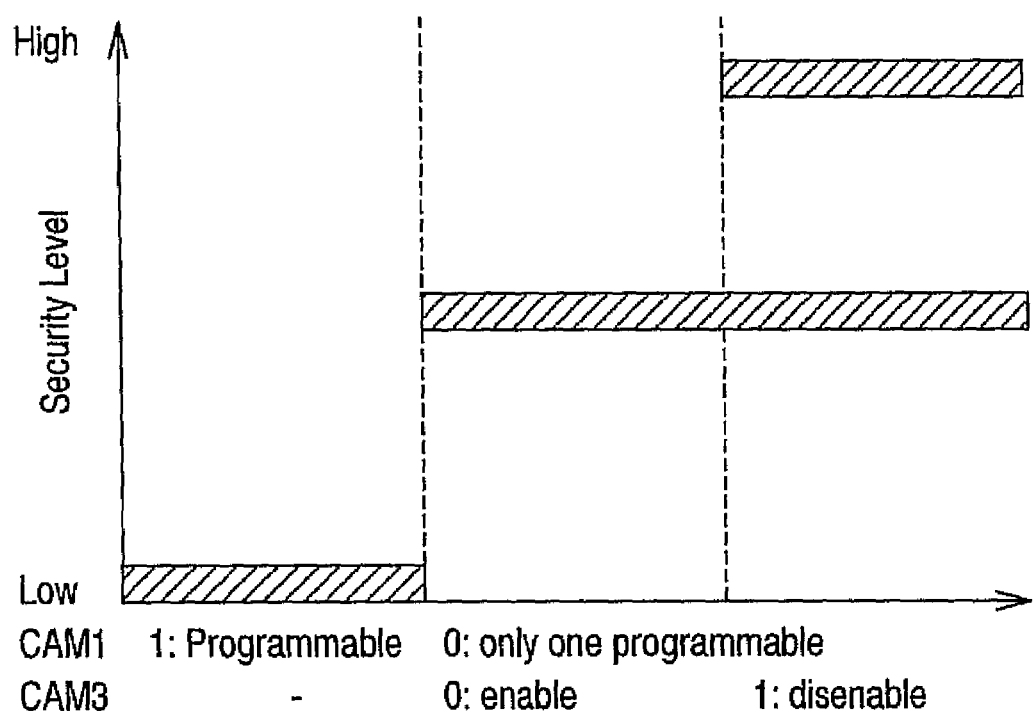
FIG. 13 shows the security levels of the non-volatile memory in accordance with the second embodiment.

FIG. 13 shows various security levels that depend on the settings of the CAM1 60 and the CAM3 30. In the case where the CAM1 data is "1", the CAM3 data does not have influence. In this case, the memory region 12 can be switched between a program disabled state and a program enabled state by performing writing or erasing in the WPCAM 20, and accordingly, the security level is low. When the CAM1 data is made "1", the memory region 12 is switched from a program enabled state to a program disabled state by performing writing in the WPCAM 20. As erasing cannot be performed in the WPCAM 20, the memory region 12 cannot be switched back to a program enabled state. Accordingly, the security level becomes higher. When the CAM3 data is made "1", writing can be performed in the WPCAM 20, regardless of whether a signal is applied to the reset pin 39. Accordingly, programming can be readily disabled in the memory region 12 with a higher security level. For example, programming can be disabled in the memory region 12 even through a communication line. In this manner, programming can be disabled readily for a higher security level, without a high voltage circuit on the system substrate on the end users' side or a large number of signal setting terminals on the communication lines. Thus, the security level can be made even higher. Through the settings of the CAM1 60 and the CAM3 30, a non-volatile memory that can satisfy the request from each application, and a desired security level can be set.

Furthermore, the WPCAM command to be input to the WPCAM control circuit 22 for controlling the WPCAMs 20 shown in FIG. 8 is different from the CAM3 command to be input to the CAM3 control circuit 32 for controlling the CAM3 30 shown in FIG. 9. In other words, each WPCAM 20 and the CAM3 30 use different commands from each other. With this arrangement, the CAM3 30 and each WPCAM 20 can be controlled independently of each other, and falsification (rewriting) of the CAM3 data in the CAM3 30 by a hacker or the likes can be prevented.

Also, the WPCAMs 20 and the CAM3 30 are formed in the different wells 28 and 38 in the semiconductor substrate on which the non-volatile memory cells are formed. In a case where data erasing is to be performed on the WPCAMs 20 and the CAM3 30 through a FN tunneling phenomenon caused by applying a voltage between the control gate and the wells, the WPCAM data and the CAM3 data might be erased at the same time if the wells 28 and 38 for the WPCAMs 20 and the CAM3 30 are connected to each other. In the second embodiment, the wells 28 and 38 as the erasing units are made different from each other, so as to prevent simultaneous erasing of the WPCAM data and the CAM3 data. Thus, a non-volatile memory with high security can be provided.

The above described embodiment is an example structure in which the different wells 28 and 38 are formed in the semiconductor substrate so as to provide different erasing units for the WPCAM data and the CAM3 data. The erasing units may be made different from each other by employing physically different structures for erasing data, such as providing different high-voltage generating circuits. Also, different data erasing methods may be utilized. For example, a FN tunneling phenomenon may be utilized by one erasing method, while hot hole injection may be carried out by the other erasing method. To make the data erasing units different from each other is to employ physically different structures for erasing data or utilize different data erasing methods. By doing so, simultaneous erasing of the WPCAM data and the CAM3 data can be prevented, and a non-volatile memory with high security can be produced.

Third Embodiment

Figure 14:
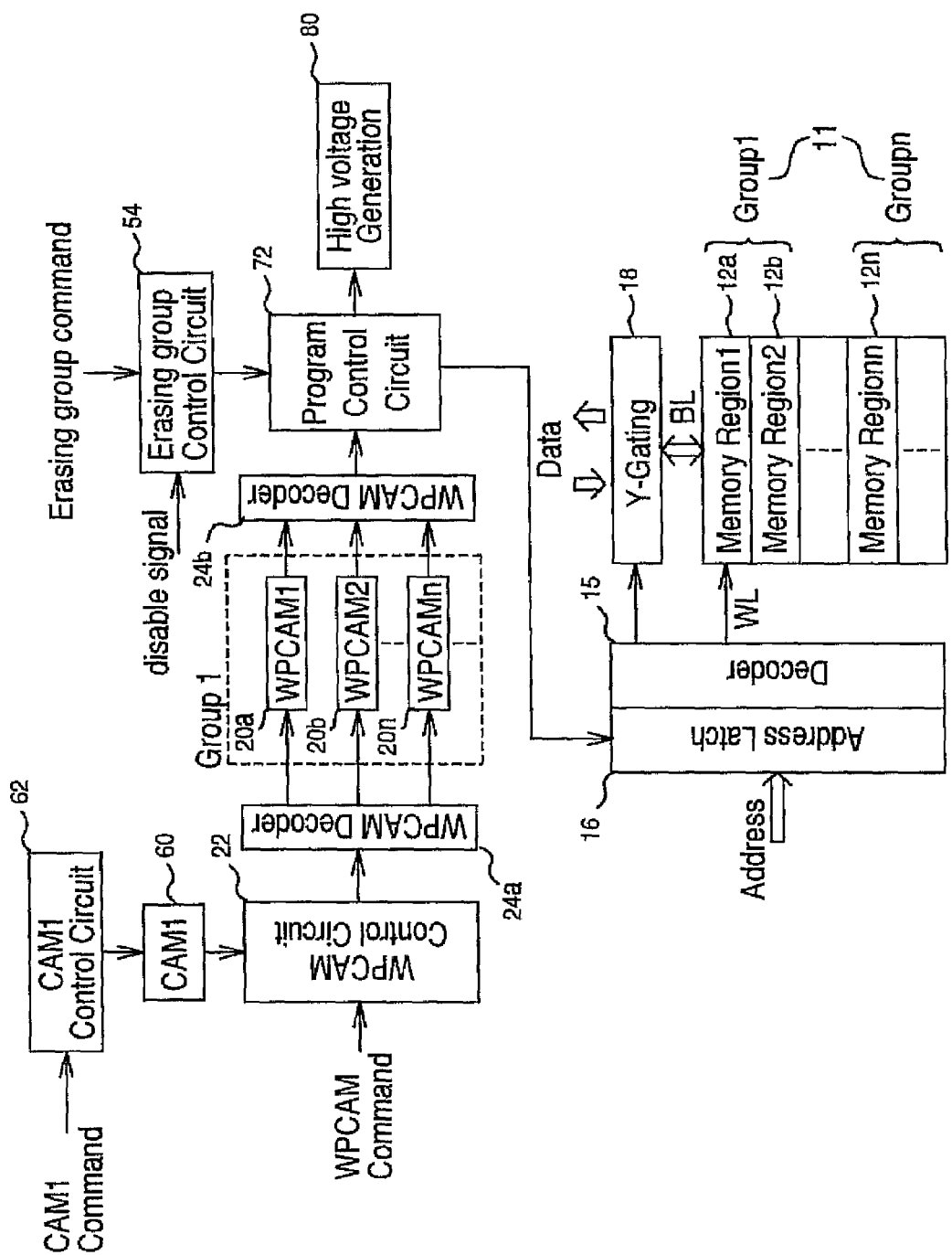
FIG. 14 is a block diagram showing the WPCAMs of a non-volatile memory in accordance with a third embodiment of the present invention.

A third embodiment is an example of a non-volatile memory that has the function of collectively performing erasing on a group of memory regions 12. The entire structure of the non-volatile memory illustrated in a block diagram should be the same as that of the first embodiment illustrated in FIG. 1. The same components as those shown in FIG. 1 are denoted by the same reference numerals as those in FIG. 1, and explanation of them is omitted herein. FIG. 14 is a block diagram showing the WPCAMs (Write Protect Content Addressable Memories) that are the disabling information memory units in the non-volatile memory in accordance with the third embodiment. A memory cell array 10 includes memory regions (12a, 12b, ... 12n, ... ). The memory regions 12 have sectors including non-volatile memory cells. A decoder 15 includes an X-decoder 13 and a Y-decoder 14. WPCAMs (20a, 20b, ... , 20n, ... ) are provided for the respective memory regions (12a, 12b, ... , 12n, ... ). In each of the WPCAMs 20, program disabling information (WPCAM data) indicating whether programming should be disabled in the corresponding memory region 12 is recorded. The memory regions 12 form groups 11.

WPCAM decoders 24a and 24b for decoding the WPCAMs 20 are connected to the WPCAMs 20. A WPCAM command is input to a WPCAM control circuit 22. A CAM1 60 is connected to the WPCAM control circuit 22. In accordance with the WPCAM command and CAM1 data, programming is performed in the WPCAMs 20 via the WPCAM decoder 24a.

A CAM1 60 is a ROM information memory unit for the STB function. In a case where programming is disabled in the memory region 12 corresponding to the WPCAM data (the first program disabling information), the ROM information (CAM1 data) indicating whether a change of the WPCAM data from "program disabling" to "program enabling" should be prohibited thereafter is recorded in the CAM1 60.

When programming is to be performed in a memory region 12, the WPCAM data (the program disabling information) in the corresponding WPCAM 20 is read into a program control circuit 72 via the WPCAM decoder 24b. In a case where the WPCAM data is program disabling data ("0"), programming is not performed on the corresponding memory region 12. In a case where the WPCAM data is program enabling data ("1"), programming is performed on the corresponding memory region 12. Therefore, the program control circuit 72 controls an address latch 16 and a high voltage generator 80.

A group erasing control circuit 54 is connected to the program control circuit 72. Group erasing information and a disable signal are input to the group erasing control circuit 54. Based on the group erasing information, the group erasing control circuit 54 collectively performs erasing on the corresponding memory regions (a group), regardless of the program disabling information in the WPCAMs 20. The disable signal (group erasing nullifying information) defines whether to nullify or validate the group erasing information. Based on the group erasing nullifying information, the group erasing information is nullified or validated. This group erasing function can perform simultaneous erasing on a larger number of memory regions than a regular erasing function. Accordingly, the total erasing time can be made shorter. This function is a private function that is generally used in the testing procedures carried out by semiconductor manufacturers and system manufacturers who mount semiconductor memories on systems (which is a hidden function that general users cannot use).

Figure 15:
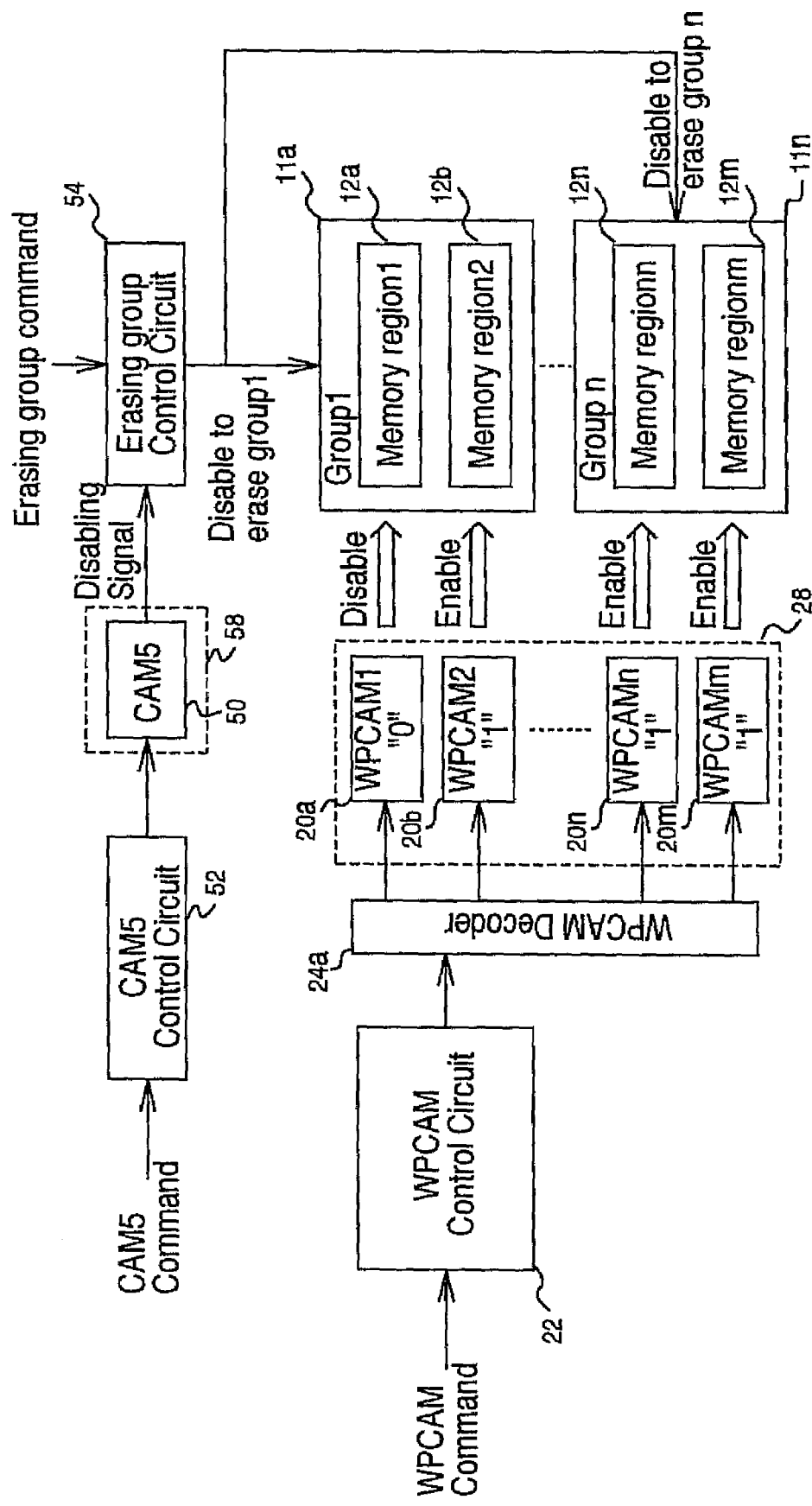
FIG. 15 illustrates the group erasing control circuit, the WPCAMs, and the memory regions of the non-volatile memory in accordance with the third embodiment.

FIG. 15 illustrates the group erasing control circuit 54, the WPCAMs 20, and the memory regions 12. The components as those shown in FIG. 14 are denoted by the same reference numerals as those in FIG. 14, and explanation of them is omitted herein. The memory regions 12 form groups. In FIG. 15, the memory region 1 (12a) and the memory region 2 (12b) form a group 1 (11a), and the memory region n (12n) and the memory region m (12m) form a group n (11n). The number of memory regions 12 forming one group 11 is not limited to two. The WPCAMs 1, 2, n, and m (20a, 20b, 20n, and 20m) correspond to the memory regions 1, 2, n, and m (12a, 12b, 12n, and 12m). In a case where the WPCAM data of a WPCAM 20 is "0", programming is disabled in the corresponding memory region 12. In a case where the WPCAM data of a WPCAM20 is "1", programming is enabled in the corresponding memory region 12.

A disable signal is input to the group erasing control circuit 54 from a CAM5 50. Based on the group erasing information and the disable signal, the group erasing control circuit 54 causes the program control circuit 72 (not shown in FIG. 15) to perform collective erasing on the memory regions in a group 11. In accordance with a CAM5 command, a CAM5 control circuit 52 performs programming on the CAM5 50. The CAM5 50 is formed in a p-type well 58 in the semiconductor substrate, and is independent of the p-type well 28 in which the WPCAMs 20 are formed.

Figure 16:
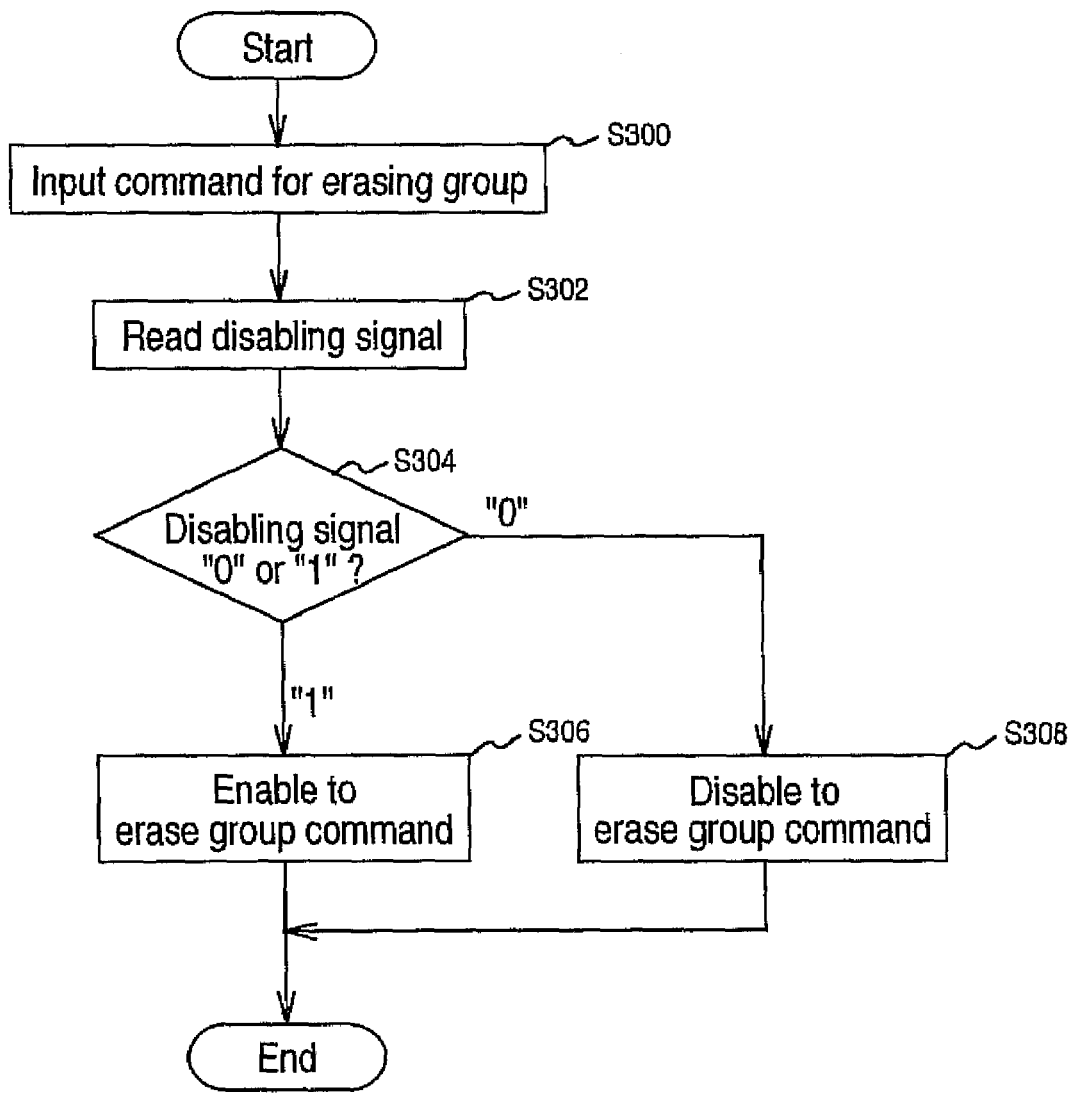
FIG. 16 is a flowchart of the operation to be performed when collective erasing is performed on a group in the non-volatile memory in accordance with the third embodiment.

FIG. 16 is a flowchart of the operation of performing collective erasing on a group. First, the CAM1 data prohibits a switch of the WPCAM data from program disabling data to program enabling data (conversion to a ROM). As shown in FIG. 16, a group erasing command is input to the group erasing control circuit 54 (step S300). The group erasing control circuit 54 reads a disable signal (step S302). The group erasing control circuit 54 then determines whether the disable signal is "0" or "1" (step S304). If the disable signal is "1", the group erasing control circuit 54 validates the group erasing command, and instructs the program control circuit 72 to perform collecting erasing on the group (step S306). If the disable signal is "0", the group erasing control circuit 54 nullifies the group erasing command, and does not instruct the program control circuit 72 to perform collective erasing on the group (step S308).

Figure 17:
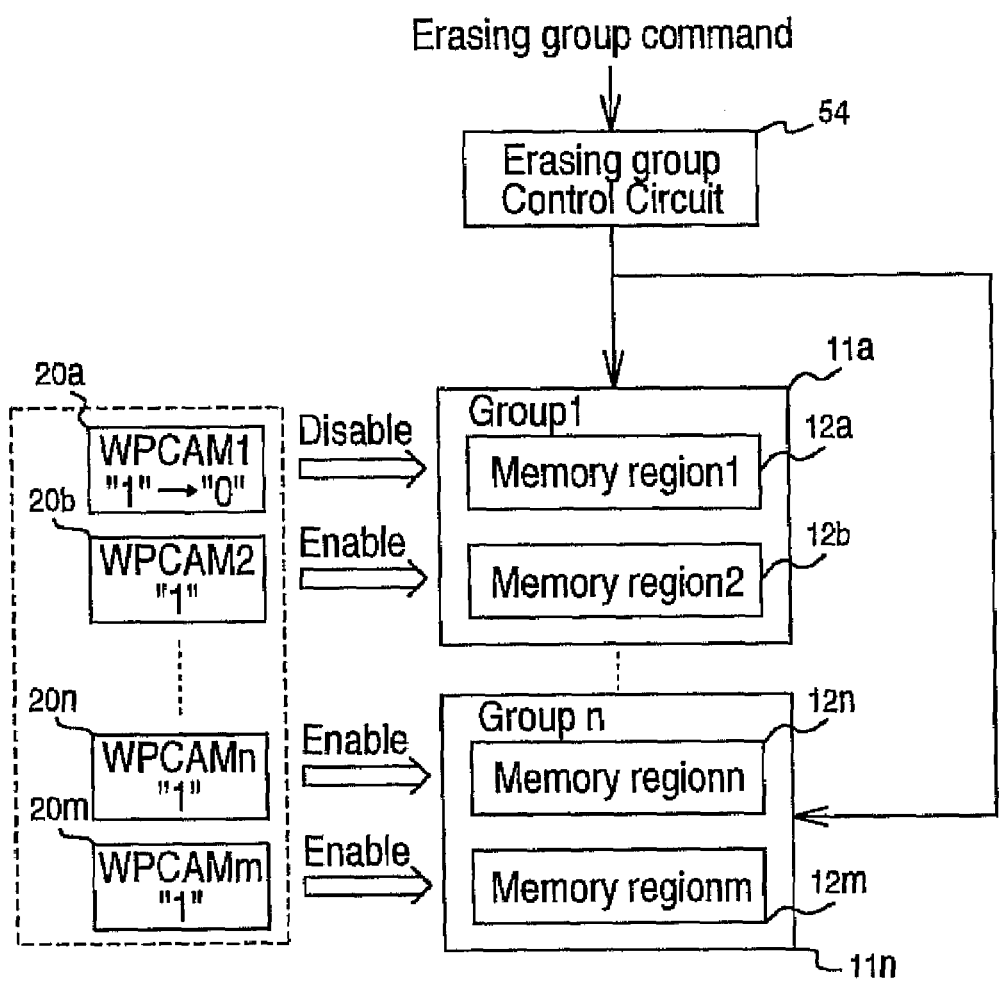
FIG. 17 illustrates the problems observed in a case where a disable signal is not input to the group erasing control circuit.

To explain the effects of the third embodiment, FIG. 17 shows the problems observed in a case where a disable signal is not input to the group erasing control circuit 54. When the CAM1 data indicates conversion to a ROM, the WPCAM1 (20a) indicates program disabling in the memory region 1 (12a), and the WPCAM2 (20b) indicates program enabling in the memory region 2 (12b). If a command for performing collective erasing on the group 1 is input to the group erasing control circuit 54, erasing cannot be performed in the memory region 12a, because the WPCAM1 (20a) indicates program disabling in the memory region 12a. On the other hand, the group erasing control circuit 54 tries to perform erasing in the memory region 1 (12a) in the group 1 (11a). In this manner, inconsistency is caused between the WPCAM data and the group erasing information. Although the security level becomes higher by virtue of the STB function (conversion of the non-volatile memory regions into ROMs) with the CAM1, the STB function conflicts with the group erasing function as the private function (hidden function), resulting in a security hole that might allow hacking.

In the third embodiment, in accordance with the disable signal, the group erasing control circuit 54 nullifies or validates the group erasing information. If the WPCAM data is inconsistent with the group erasing information, the group erasing control circuit 54 nullifies the group erasing information in accordance with the disable signal. In this manner, inconsistency between the WPCAM data and the group erasing information is prevented.

The third embodiment also includes the CAM5 50 (a group erasing nullifying information memory unit) that stores the disable signal (the group erasing nullifying information). The WPCAM command to be input to the WPCAM control circuit 22 for controlling the WPCAMs 20 shown in FIG. 15 is different from the CAM5 command to be input to the CAM5 control circuit 52 for controlling the CAM5 50. In other words, each WPCAM 20 and the CAM5 50 use different commands from each other. With this arrangement, the CAM5 50 and each WPCAM 20 are controlled independently of each other, so that falsification (rewriting) of the disable signal in the CAM5 50 by a hacker or the like can be prevented.

Also, the WPCAMs 20 and the CAM5 50 are formed in different wells 28 and 58 in the semiconductor substrate on which the non-volatile memory cells are formed. In a case where data erasing is to be performed on the WPCAMs 20 and the CAM5 50 through a FN tunneling phenomenon caused by applying a voltage between the control gate and the wells, the WPCAM data and the CAM5 data might be erased at the same time if the wells 28 and 58 for the WPCAMs 20 and the CAM5 50 are connected to each other. In the third embodiment, the wells 28 and 58 as the erasing units are made different from each other, so as to prevent simultaneous erasing of the WPCAM data and the CAM5 data. Thus, a non-volatile memory with high security can be provided.

The above described embodiment is an example structure in which the different wells 28 and 58 are formed in the semiconductor substrate so as to provide different erasing units for the WPCAM data and the CAM5 data. The erasing units may be made different from each other by employing physically different structures for erasing data, such as providing different high-voltage generating circuits. Also, different data erasing methods may be utilized. For example, a FN tunneling phenomenon may be utilized by one erasing method, while hot hole injection may be carried out by the other erasing method. To make the data erasing units different from each other is to employ physically different structures for erasing data or utilize different data erasing methods. By doing so, simultaneous erasing of the WPCAM data and the CAM5 data can be prevented, and a non-volatile memory with high security can be produced.

Figure 18:
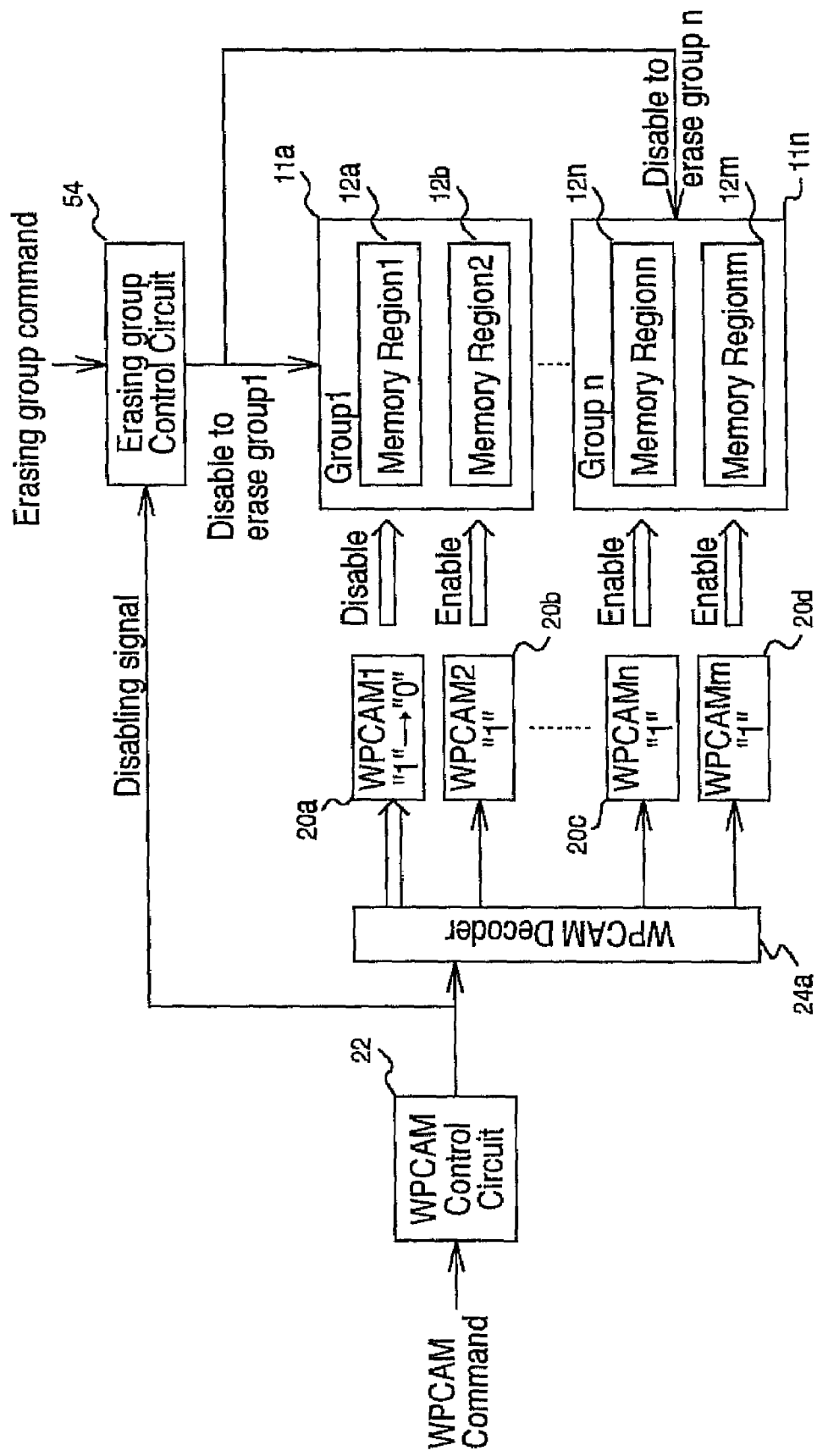
FIG. 18 illustrates a first modification of the third embodiment.

FIG. 18 illustrates a first modification of the third embodiment. As shown in FIG. 18, when the CAM1 data indicates ROM conversion, the WPCAM control circuit 22 disables programming in one of the memory regions 12 (the memory region 1 (12a), for example). Therefore, "0" is written in the corresponding WPCAM 20 (the WPCAM1 (20a), for example). Here, the WPCAM control circuit 22 outputs a disable signal to the group erasing control circuit 54. The group erasing control circuit 54 holds the disable signal, and nullifies the group erasing information. The disable signal may be written into and held in the CAM5 50 shown in FIG. 15, for example.

In the first modification, in a case where programming is disabled in at least one memory region 12 corresponding to the program disabling information, the WPCAM control circuit 22 (the disabling information control circuit) outputs a disable signal (the group erasing nullifying information) to the group erasing control circuit 54. Thus, inconsistency between the WPCAM data and the group erasing information can be prevented.

Figure 19:
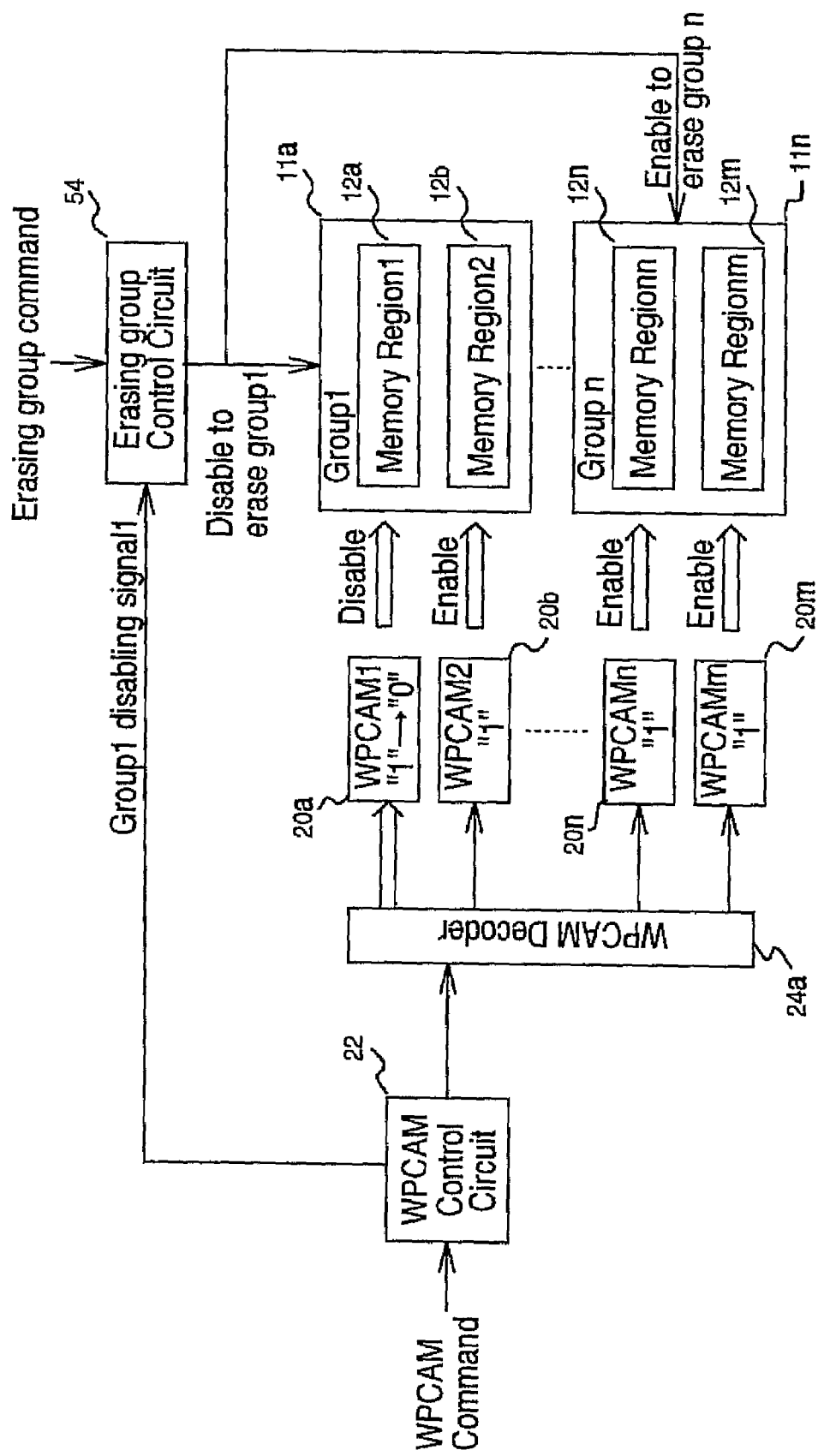
FIG. 19 illustrates a second modification of the third embodiment.

FIG. 19 illustrates a second modification of the third embodiment. As shown in FIG. 19, when the CAM1 data indicates ROM conversion, the WPCAM control circuit 22 disables programming in one of the memory regions 12 (the memory region 1 (12*a*), for example). Therefore, "0" is written in the corresponding WPCAM 20 (the WPCAM1 (20*a*), for example). Here, the WPCAM control circuit 22 outputs a disable signal for the group (the group 1 (11*a*)), to which the memory region 12 belongs, to the group erasing control circuit 54. The group erasing control circuit 54 holds the disable signal, and nullifies the group erasing information for the corresponding group (the group (1 (11*a*)).

As described above, where there are groups of memory regions, there is the same number of pieces of group erasing information as the number of groups. Accordingly, collective erasing can be performed for each group. In a case where the WPCAM 20 (the disabling information memory unit) corresponding to at least one of the memory regions 12 in one group holds program disabling data, the WPCAM control circuit 22 (the disabling information control circuit) outputs a group disable signal (the group erasing nullifying information) for nullifying the group erasing information corresponding to the one group, to the group erasing control circuit 54. Thus, collective erasing is disabled only in the group containing the program-disabled memory region 12.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A semiconductor device comprising:
   a plurality of memory regions that include non-volatile memory cells;
   a plurality of disabling information memory units that correspond to the memory regions, each of the disabling information memory units storing first program disabling information indicating whether programming is to be disabled or enabled in each corresponding memory region;
   a program disabling information selection circuit that outputs second program disabling information for disabling programming in a corresponding memory region, regardless of the first program disabling information, when programming is disabled collectively in the memory regions in accordance with collective program disabling information indicating whether programming is to be disabled collectively in the memory regions, the program disabling information selection circuit outputting the first program disabling information as the second program disabling information when programming is not collectively disabled; and
   a program control circuit that disables or enables programming in the corresponding memory region in accordance with the second program disabling information.

2. The semiconductor device as claimed in claim 1, further comprising
   a collective disabling information memory unit that stores the collective program disabling information.

3. The semiconductor device as claimed in claim 1, further comprising a disabling information control circuit that prohibits a change of the first program disabling information from a program disabling state to a program enabling state, after the first program disabling information is switched to the program disabling state.

4. The semiconductor device as claimed in claim 3, further comprising
   a ROM information memory unit that stores ROM information indicating whether a change of the first program disabling information from the program disabling state to the program enabling state is prohibited, after the first program disabling information is switched to the program disabling state,
   wherein the disabling information control circuit prohibits the change of the first program disabling information from the program disabling state to the program enabling state in accordance with the ROM information after the first program disabling information is switched to the program disabling state.

5. The semiconductor device as claimed in claim 2, wherein the disabling information memory units and the collective disabling information memory unit use different commands from each other.

6. The semiconductor device as claimed in claim 2, wherein an erasing unit for erasing the first program disabling information in the disabling information memory units is different from an erasing unit for erasing the collective program disabling information in the collective disabling information memory unit.

7. A method of controlling a semiconductor device that has a plurality of memory regions including a plurality of non-volatile memory cells, the method comprising the steps of:
   setting second program disabling information in a program disabling state, regardless of first program disabling information indicating whether programming is to be disabled or enabled in a corresponding memory region, when programming is disabled collectively in the memory regions in accordance with collective program disabling information indicating whether programming is to be disabled or enabled collectively in the memory regions, and setting the first program disabling information as the second program disabling information when programming is not collectively disabled; and
   disabling or enabling programming in the corresponding memory region in accordance with the second program disabling information.

8. The method as claimed in claim 7, further comprising the step of
   prohibiting a change of the first program disabling information from a program disabling state to a program enabling state, after the first program disabling information is switched to the program disabling state.

9. A semiconductor device comprising:
   a plurality of memory regions that include non-volatile memory cells;
   a plurality of disabling information memory units that correspond to the memory regions, each of the disabling information memory units storing program disabling information indicating whether programming is to be disabled or enabled in each corresponding memory region;
   an input terminal that inputs auxiliary program disabling information indicating whether a change of the program disabling information from a program enabling state and to a program disabling state for a corresponding memory unit is allowed; and a disabling information control circuit that allows or does not allow a change of the program disabling information from the program enabling state to the program disabling state for the corresponding memory region in accordance with the auxiliary program disabling information when auxiliary information nullifying information indicating whether the auxiliary program disabling information is to be nullified or validated indicates that the auxiliary program disabling information is valid, the disabling information control circuit allowing a change of the program disabling information from the program enabling state to the program disabling state for the corresponding memory region, regardless of the auxiliary program disabling information, when the auxiliary information nullifying information indicates that the auxiliary program disabling information is invalid.

10. The semiconductor device as claimed in claim 9, further comprising
an auxiliary information nullifying information memory unit that stores the auxiliary information nullifying information.

11. The semiconductor device as claimed in claim 9, wherein the disabling information control circuit prohibits a change of the program disabling information from the program disabling state to the program enabling state for the corresponding memory region, after the program disabling information is switched to the program disabling state for the corresponding memory state in accordance with ROM information indicating whether to prohibit a change of the program disabling information from the program disabling state to the program enabling state for the corresponding memory region.

12. The semiconductor device as claimed in claim 9, wherein, when ROM information indicating whether to prohibit a change of the program disabling information from the program disabling state to the program enabling state for the corresponding memory region indicates that the change from the program disabling state to the program enabling state is not prohibited, a change of the program disabling information from the program enabling state to the program disabling state is allowed or not allowed in accordance with the auxiliary program disabling information, regardless of the auxiliary information nullifying information.

13. The semiconductor device as claimed in claim 10, wherein the disabling information memory units and the auxiliary information nullifying information memory unit use different commands from each other.

14. The semiconductor device as claimed in claim 9, wherein an erasing unit for erasing the program disabling information in the disabling information memory units is different from an erasing unit for erasing the auxiliary information nullifying information in the auxiliary information nullifying information memory unit.

15. A method of controlling a semiconductor device that has a plurality of memory regions including a plurality of non-volatile memory cells, the method comprising the steps of:
inputting auxiliary program disabling information indicating whether to allow a change of program disabling information from a program enabling state to a program disabling state, the program disabling information indicating whether programming is to be disabled or enabled in each corresponding memory region; and
allowing or not allowing a change of the program disabling information from the program enabling state to the program disabling state for the corresponding memory region when the auxiliary program disabling information is valid in accordance with auxiliary information nullifying information indicating whether the auxiliary program disabling information is to be nullified or validated, and allowing a change of the program disabling information from the program enabling state to the program disabling state for the corresponding memory region, regardless of the auxiliary program disabling information, when the auxiliary information nullifying information indicates that the auxiliary program disabling information is invalid.

16. The method as claimed in claim 15, further comprising the step of
prohibiting a change of the program disabling information from the program disabling state to the program enabling state, after the program disabling information is switched to the program disabling state in accordance with ROM information indicating whether to prohibit a change of the program disabling information from the program disabling state to the program enabling state for the corresponding memory region.

17. A semiconductor device comprising:
a plurality of memory regions that include non-volatile memory cells;
a plurality of disabling information memory units that correspond to the memory regions, each of the disabling information memory units storing program disabling information indicating whether programming is to be disabled or enabled in each corresponding memory region;
a disabling information control circuit that prohibits a change of the program disabling information from a program disabling state to a program enabling state, after the program disabling information is switched to the program disabling state; and
a group erasing control circuit that performs erasing collectively in the memory regions in accordance with group erasing information,
the group erasing control circuit nullifying or validating the group erasing information in accordance with group erasing nullifying information indicating whether the group erasing information is to be nullified or validated.

18. The semiconductor device as claimed in claim 17, further comprising
a group erasing nullifying information memory unit that stores the group erasing nullifying information.

19. The semiconductor device as claimed in claim 17, wherein the disabling information control circuit outputs the group erasing nullifying information for nullifying the group erasing information to the group erasing control circuit, when at least one piece of the program disabling information is switched to a program disabling state.

20. The semiconductor device as claimed in claim 17, wherein:
the memory regions are divided into a plurality of groups;
collective erasing can be performed in each of the groups of memory regions; and
the number of pieces of the group erasing information is the same as the number of the groups.

21. The semiconductor device as claimed in claim 19, wherein the disabling information control circuit outputs the group erasing nullifying information for nullifying the group erasing information as to one of the groups to the group erasing control circuit, when programming is disabled in the disabling information memory unit corresponding to at least one of the memory regions in the one of the groups.

22. The semiconductor device as claimed in claim 18, wherein the disabling information memory units and the group erasing nullifying information memory unit use different commands from each other.

23. The semiconductor device as claimed in claim 18, wherein an erasing unit for erasing the program disabling information in the disabling information memory units is different from an erasing unit for erasing the group erasing nullifying information in the group erasing nullifying information memory unit.

24. A method of controlling a semiconductor device that has a plurality of memory regions including non-volatile memory cells, the method comprising the steps of:
 prohibiting a change of program disabling information from a program disabling state to a program enabling state, after the program disabling information is switched to the program disabling state, the program disabling information indicating whether programming is to be disabled or enabled in each corresponding memory region;
 performing erasing collectively in the memory regions in accordance with group erasing information indicating collective erasing in the memory regions; and
 nullifying or validating the group erasing information.

25. The method as claimed in claim 24, wherein the group erasing information is nullified when at least one piece of the program disabling information is switched to the program disabling state.

* * * * *